US012473776B2

(12) United States Patent
Ghauforian

(10) Patent No.: US 12,473,776 B2
(45) Date of Patent: Nov. 18, 2025

(54) SYSTEMS AND METHODS FOR THE IMPLEMENTATION OF INTERCHANGEABLE DOOR PANELS

(71) Applicant: Armin Ghauforian, Coquitlam (CA)

(72) Inventor: Armin Ghauforian, Coquitlam (CA)

( * ) Notice: Subject to any disclaimer, the term of this patent is extended or adjusted under 35 U.S.C. 154(b) by 137 days.

(21) Appl. No.: 18/204,916

(22) Filed: Jun. 1, 2023

(65) Prior Publication Data

US 2023/0392435 A1 Dec. 7, 2023

Related U.S. Application Data

(60) Provisional application No. 63/347,982, filed on Jun. 1, 2022.

(51) Int. Cl.
*E06B 3/70* (2006.01)

(52) U.S. Cl.
CPC .... *E06B 3/7003* (2013.01); *E06B 2003/7049* (2013.01)

(58) Field of Classification Search
CPC ... E06B 3/7001; E06B 2003/7049; E06B 7/28
See application file for complete search history.

(56) References Cited

U.S. PATENT DOCUMENTS 3,997,220 A * 12/1976 Mayer .................. A47F 3/00 312/204
7,484,286 B2 * 2/2009 Fowler .................. E06B 9/52 160/113
10,223,940 B2 * 3/2019 Pollard .................. G09F 7/10
10,480,241 B1 * 11/2019 Jude .................. E05G 1/08
10,512,351 B1 * 12/2019 Valeriano .................. E05B 47/0001
10,676,982 B1 * 6/2020 Harris .................. E06B 3/485
10,997,878 B2 * 5/2021 Culhane .................. G09F 23/00
11,242,708 B1 * 2/2022 Hall .................. E06B 3/7001
11,649,665 B1 * 5/2023 Earnest .................. E06B 3/485 52/211
11,738,593 B2 * 8/2023 Webster, III .................. E06B 3/7001 160/130
12,360,137 B1 * 7/2025 Zhou .................. B25H 1/10
2008/0172949 A1 * 7/2008 Brisbois .................. E06B 3/30 49/460
2010/0108210 A1 * 5/2010 Salas Garcia .................. A47H 21/00 150/154
2010/0251654 A1 * 10/2010 Paul .................. E06B 3/7001 52/506.05

(Continued)

*Primary Examiner* — Beth A Stephan
(74) *Attorney, Agent, or Firm* — Wilson Dutra, PLLC; Camille A. Wilson

(57) ABSTRACT

The present disclosure provides for an interchangeable door system. The interchangeable door system may comprise a door, designed to interface with one or more panels. The door may comprise one or more insertion mechanisms, whereby the door and the panels may be joined. The interchangeable door system may comprise one or more panels. The panels may extrude-extend from the door to form a three-dimensional shape. The panels may comprise one or more guide pins. The panels may comprise one or more locking pins. The panels may comprise an electronic device. The panels may comprise an interactive device. The panels may comprise a storage device. The panels may comprise a securing mechanism.

15 Claims, 32 Drawing Sheets

(56) References Cited

U.S. PATENT DOCUMENTS

| | | | | |
|---|---|---|---|---|
| 2010/0300003 | A1* | 12/2010 | Goode | E06B 3/72<br>49/504 |
| 2012/0006498 | A1* | 1/2012 | Potter | E04F 11/1851<br>160/368.1 |
| 2012/0159826 | A1* | 6/2012 | Eichner | E06B 3/72<br>40/779 |
| 2013/0105092 | A1* | 5/2013 | Rainaldi | E06B 3/7001<br>160/90 |
| 2014/0182176 | A1* | 7/2014 | Kaleugher | G09F 7/10<br>40/490 |
| 2016/0362933 | A1* | 12/2016 | Mueller | E06B 9/00 |
| 2017/0306693 | A1* | 10/2017 | Potter | E06B 9/04 |
| 2018/0058138 | A1* | 3/2018 | Binder | E06B 3/30 |
| 2019/0257142 | A1* | 8/2019 | Koehl | E06B 3/72 |
| 2019/0338583 | A1* | 11/2019 | Jude | E06B 7/34 |

* cited by examiner

1030

1600

SYSTEMS AND METHODS FOR THE IMPLEMENTATION OF INTERCHANGEABLE DOOR PANELS

BACKGROUND

For thousands of years, doors have formed an essential function as gateways and thresholds to areas of privileged admittance. Fundamentally, the door has operated as an imposed barrier that can be removed at the discretion of the owner. With this functionality mastered in the conception of the original door design, there has been little motivation to change the appearance or functionality of the door throughout time.

Truly, many doors are still made in the form of dated patterns and appearances similar to their design half a century ago. Manufacturing and demand have limited designers, architects, artists, and manufacturers to mostly mass-produced doors that have a fixed look. This mass production enables the doors to retain a lower cost for manufacture.

In the present day, most doors have a fixed façade. Once they are installed there is little to no possibility of modifying the aesthetics of the door, install ornaments and seasonal decorations, or add features and patterns without damaging the door. Most current aesthetics involve external ornamentation that is hung or attached to the outside of the door. This leaves little opportunity to integrate other ornamentation or functionality into the door without affecting the door permanently.

Due to the restrictions imposed by a generic door, any opportunity for improved utility or aesthetic appearance is lost. As an example, fortifications to strengthen doors for reasons such as an approaching storm or hurricane is often a crude set of extra materials that are attached to the door in a manner that can permanently affect the appearance of the door. This is also noticeable in demographics, such as disabled persons, who may require a modified door. Unable to modify the current door causes these people to purchase a completely new door, which is often expensive due to the customization.

SUMMARY OF THE DISCLOSURE

What is needed is a door that may provide interchangeable utility and personalized aesthetics according to the preferences of a user. The present disclosure provides for an interchangeable door system. In some embodiments, the interchangeable door system may comprise at least one door, designed to interface with one or more interchangeable panels. In some implementations, the door may comprise one or more insertion mechanisms, whereby the door and the panel may be joined. In some aspects, the interchangeable door system may comprise one or more panels. In some embodiments, a panel may extend from the door to form a three-dimensional shape.

In some implementations, each panel may comprise one or more guide pins. In some aspects, each panel may comprise one or more locking pins. In some embodiments, each panel may comprise one or more inserts. In some implementations, when an interchangeable door panel comprises an insert, the insert may comprise one or more inanimate objects, such as figurines. In some aspects, an insert may comprise one or more living organisms or a terrarium configured to house one or more living organisms.

In some embodiments, one or more of the panels may comprise at least one electronic device. In some implementations, the panel may comprise an interactive device. In some aspects, the panel may comprise a storage device. In some embodiments, the panel may comprise a securing mechanism.

A number of embodiments of the present disclosure will be described. While this specification contains many specific implementation details, these should not be construed as limitations on the scope of any disclosures or of what may be claimed, but rather as descriptions of features specific to particular embodiments of the present disclosure. It is understood to those skilled in the art that variations, modifications, and alterations may be apparent. It will be understood that various modifications may be made without departing from the spirit and scope of the disclosure.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

The present disclosure provides generally for an interchangeable door system. According to the present disclosure, an interchangeable door system may comprise at least one door, designed to interface with one or more interchangeable panels. In some implementations, the door may comprise one or more insertion mechanisms, whereby the door and each panel may be joined. In some aspects, the interchangeable door system may comprise one or more interchangeable panels.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Panel: as used herein, refers to a device that at least temporarily attaches to a door. In some embodiments, a panel may interface with a door through a predefined attachment mechanism, such as an extruded slot or a recessed groove. In some implementations, a panel may comprise one or more internal subcomponents, such as, for example and not limitation, one or more electronic devices or interactive devices. In some aspects, a panel may be configured to interface with one or more of: a door or a door frame.

Insert: as used herein, refers to a material or medium that may be at least partially inserted into a panel. In some embodiments, an insert may comprise one or more materials, such as a figurine encased in epoxy. In some implementations, an insert may comprise a separate cavity for storing materials, such as, for example and not limitation, one or more removable soil inserts for planting small plants within the insert.

Figure 1A:
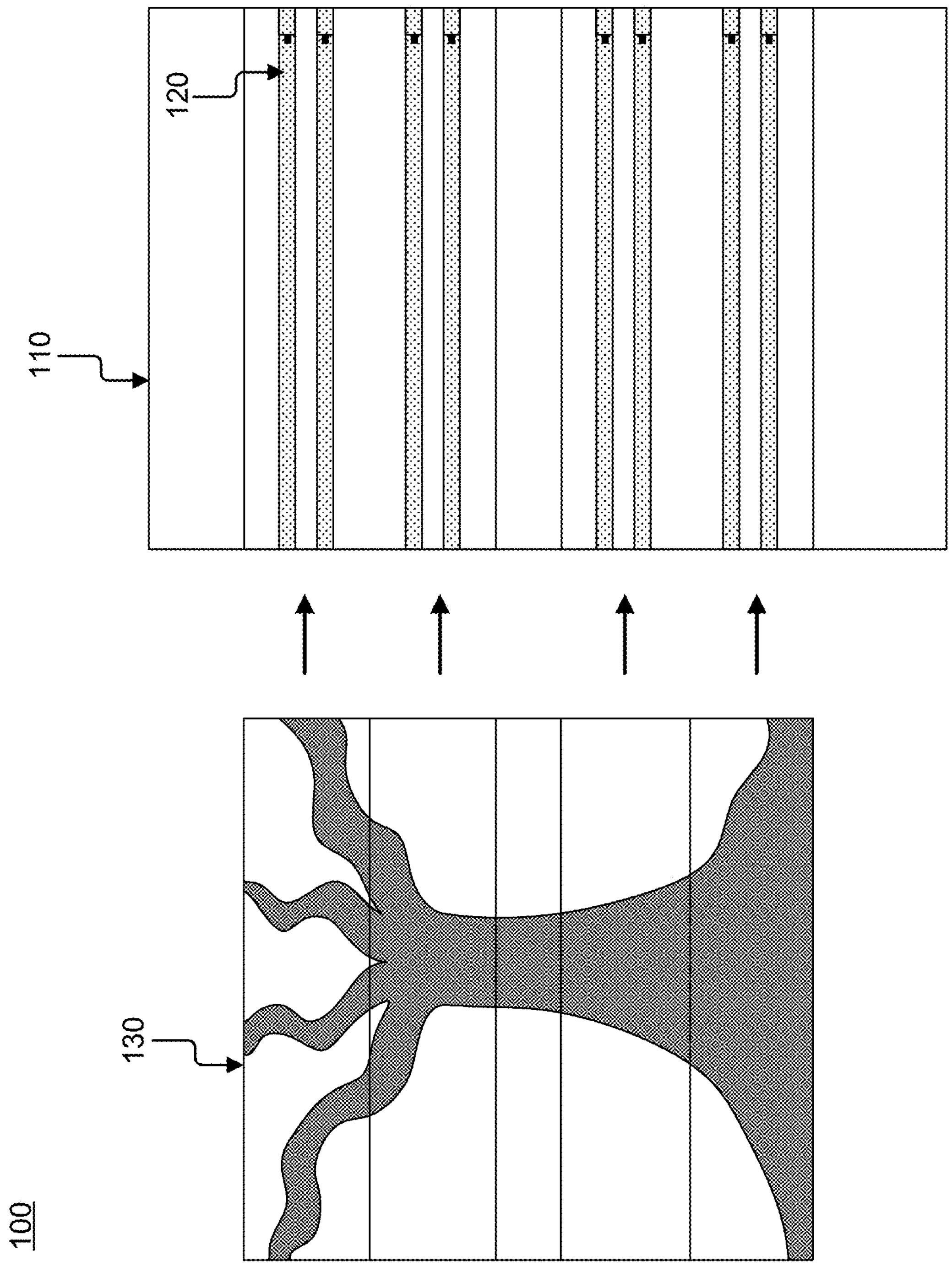
FIG. 1A illustrates an exemplary interchangeable door system, according to some embodiments of the present disclosure.
Figure 1B:
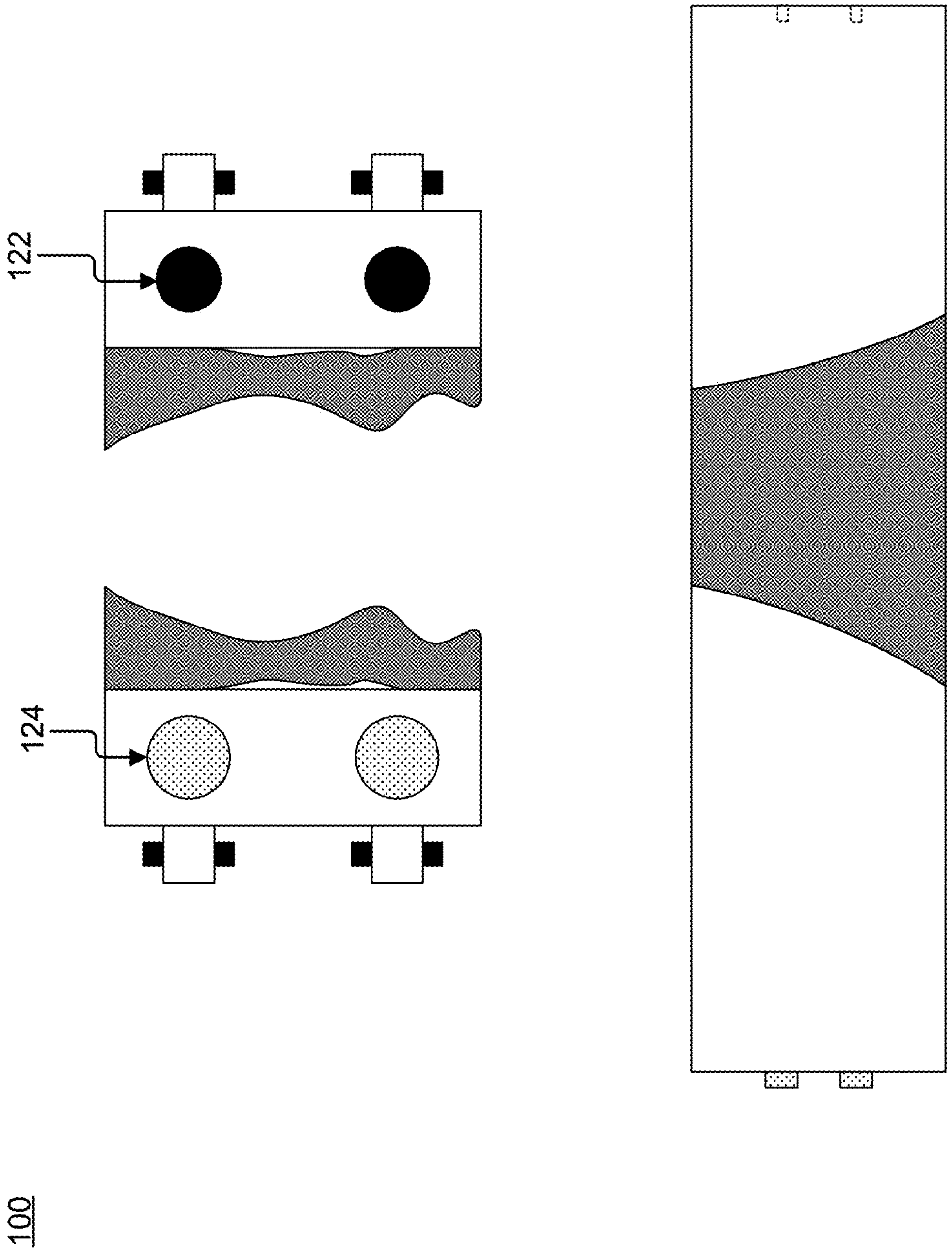
FIG. 1B illustrates a side-view of an exemplary interchangeable door system, according to some embodiments of the present disclosure.

Referring now to FIGS. 1A-B, an exemplary interchangeable door system 100, according to some embodiments of the present disclosure, is illustrated. In some embodiments, the interchangeable door system 100 may comprise at least one door 110. In some implementations, the interchangeable door system 100 may comprise one or more interchangeable panels 130. In some aspects, the door 110 may comprise at least one insertion mechanism 120. In some implementations, the insertion mechanism 120 may allow the panels 130 to be removably secured or attached to the door 110. In some embodiments, the insertion mechanism 120 may comprise one or more recessed grooves within the door 110 that match the dimensions of extrusions on the panels 130.

As a non-limiting illustrative example, the door 110 may comprise insertion mechanisms 120 for three panels 130 that may comprise portions of an artistic rendering of a tree. The panels 130 may be attached to the door 110 via the insertion mechanism 120. There may be different panels of the canopy of the tree that may portray the tree in different seasons of the year. As it becomes fall, the user may remove the panel 130 containing a green tree canopy and replace it with a tree canopy comprising red, orange, and yellow leaves to indicate a fall tree canopy. The insertion mechanisms 120 and associated panels 130 may facilitate modification of the appearance or function of the door without having to replace the door.

In some aspects, each panel 130 may comprise one or more guide pins 122. In some embodiments, the guide pins 122 may interface with the insertion mechanism 120 to facilitate alignment of the panel 130 with respect to the door 110. In some aspects, the guide pins 122 may be configured to facilitate securing the panel 130 to the door 110, thereby avoiding issues such as an overhanging panel 130 lip that hits the door 110 frame as a result of partial insertion into the insertion mechanism 120.

In some implementations, each panel 130 may comprise one or more locking pins 124. In some aspects, the locking pins 124 may at least temporarily secure the panel 130 to the door 110. In some embodiments, the locking pins 124 may interface with the door frame. In some implementations, the locking pins 124 may removably secure the panels 130 via one or more screws, magnets, fasteners, or other non-limiting examples of fastening mechanisms.

Figure 2A:
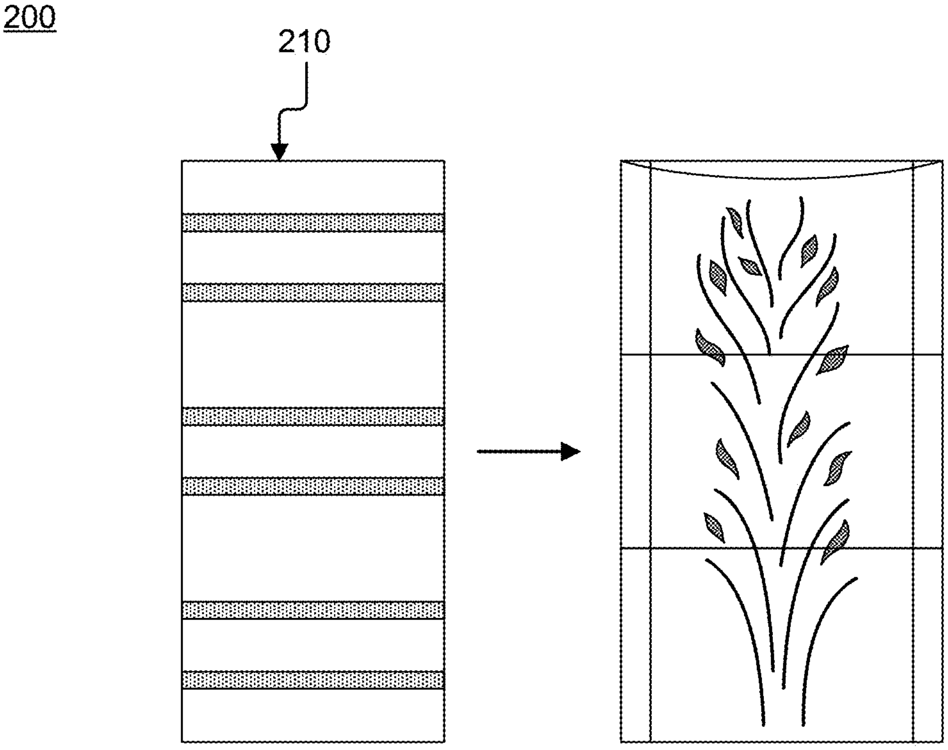
FIG. 2A illustrates an exemplary interchangeable door system, according to some embodiments of the present disclosure.
Figure 2B:
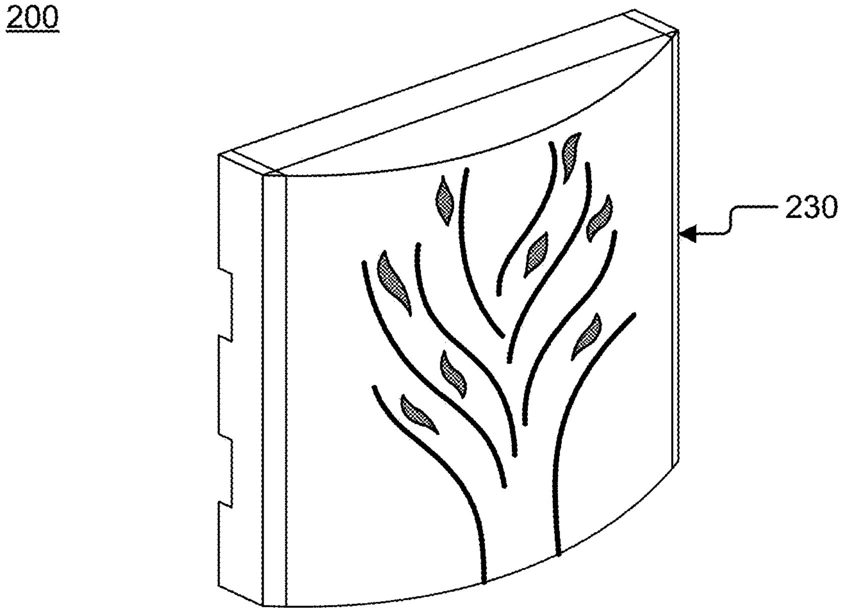
FIG. 2B illustrates an exemplary interchangeable door system, according to some embodiments of the present disclosure.

Referring now to FIGS. 2A-B, an exemplary interchangeable door system 200, according to some embodiments of the present disclosure, is illustrated. In some embodiments, the interchangeable door system 200 may comprise at least one door 210. In some implementations, the interchangeable door system 200 may comprise one or more interchangeable panels 230. In some aspects, the panels 230 may interface with the door via one or more insertion mechanisms.

In some embodiments, the insertion mechanisms may extrude from the door 210. In some implementations, the extrusions may allow the door 210 to retain a seal without the concern of a modified door seal as a result of recessed grooves in the surface of the door 210.

In some aspects, the panel 230 may extrude from the planar surface of the door. For example, the panel 230 may comprise a bevel that forms an extruded curvature from the surface of the door. This extrusion may provide a unique aesthetic attribute to the door 210. In some embodiments, the panel 230 may comprise insulation. The insulation may reduce heat loss through the door. In some implementations, a panel 230 extrusion may comprise hollow space to insert additional insulation.

Referring now to FIGS. 3A-F, various aspects of an exemplary interchangeable door system 300, according to some embodiments of the present disclosure, are illustrated. In some embodiments, the interchangeable door system 300 may comprise one or more interchangeable panels 330. In some aspects, each panel 330 may comprise one or more guide pins 322. In some implementations, the panel 330 may comprise one or more locking pins 324.

In some implementations, the panel 330 may interface with a door via at least one insertion mechanism 320. In some embodiments, the insertion mechanism 320 may comprise at least one recessed slot within at least one internal the cavity within the door. In some implementations, the recessed slot may comprise a lip to assist in maintaining the panel 330 in parallel alignment relative to the door.

In some aspects, the insertion mechanism 320 may comprise at least one insertable slot 325 configured to interface with the locking pin 324. In some embodiments, the insertable slot 325 may at least temporarily secure the panel 330, 331 in place after the panel 330, 331 is attached to the door via the insertion mechanism 320. In some implementations, the insertable slot 325 may comprise at least one mechanical component such as a latch, a screw, a fastener, or a magnet, by way of example and not limitation, that interfaces with the locking pin 324 to form a releasably secured connection. In some embodiments, the locking pin 324 may be secured to the insertable slot 325 and accessed via the door or panel, as non-limiting options of securable access.

In some aspects, the panels 330, 331 may comprise a plurality of sizes. In some embodiments, the panels 330, 331 may comprise one or more extrusions to interface with the insertion mechanism 320, depending on the size of the panels 330, 331. In some implementations, different sized panels 330, 331 may be inserted in adjacent, complimentary positions to form a smooth, continuous surface when secured to the door.

In some aspects, the panel 330 may comprise one or more guide pins 322. In some embodiments, the guide pins may ensure precise alignment when interfacing with the insertion mechanism 320 that may provide ease and convenience when inserting and removing panels 330, 331 from the door. In some implementations, the guide pins 322 may assist in aligning secondary components embedded within the panels 330, such as an electronic device 350.

Figure 3A:
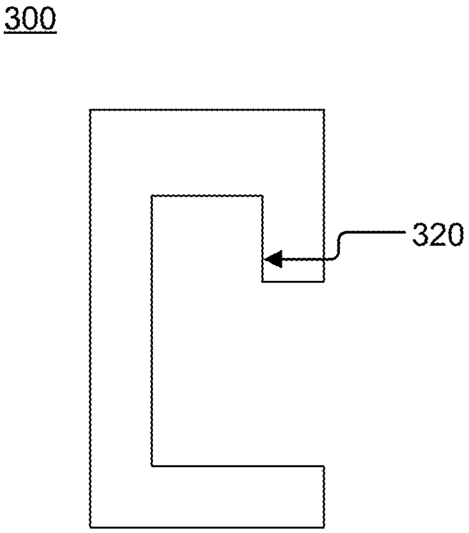
FIG. 3A illustrates an exemplary insertion mechanism, according to some embodiments of the present disclosure.
Figure 3B:
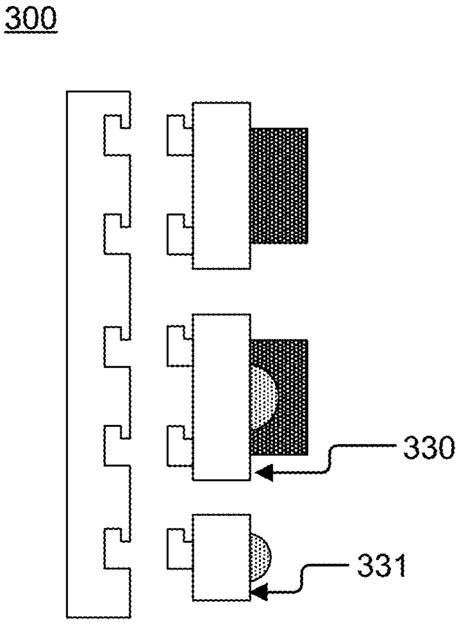
FIG. 3B illustrates an exemplary door interfacing with a plurality of interchangeable door panels via a plurality of guide pins, according to some embodiments of the present disclosure.
Figure 3C:
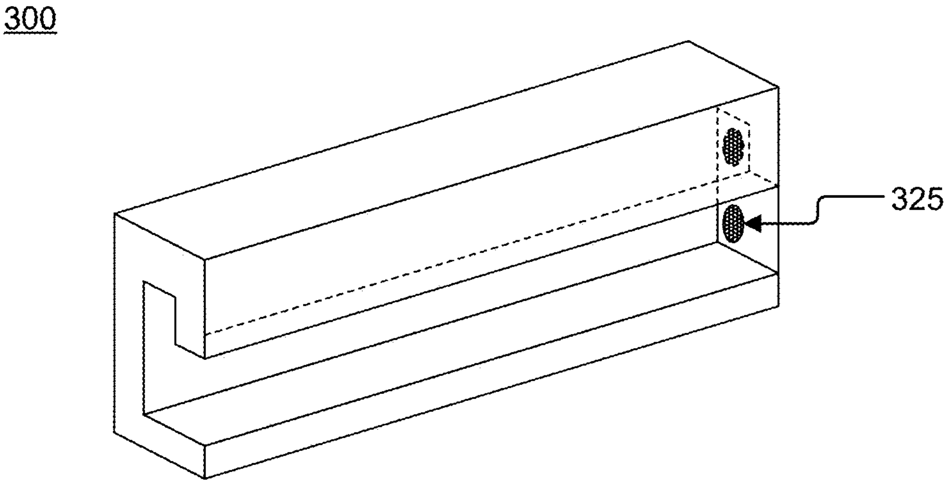
FIG. 3C illustrates an exemplary insertion mechanism, according to some embodiments of the present disclosure.
Figure 3D:
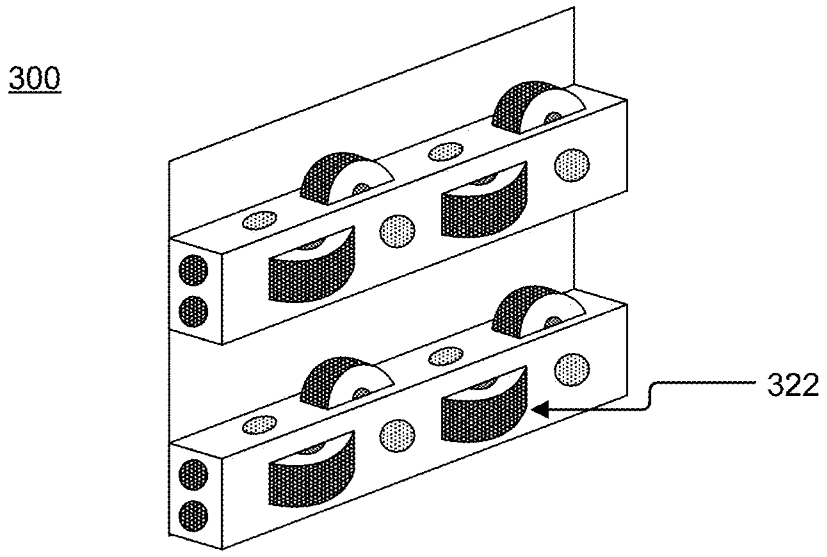
FIG. 3D illustrates an exemplary interchangeable door panel comprising guide pins and locking pins, according to some embodiments of the present disclosure.
Figure 3E:
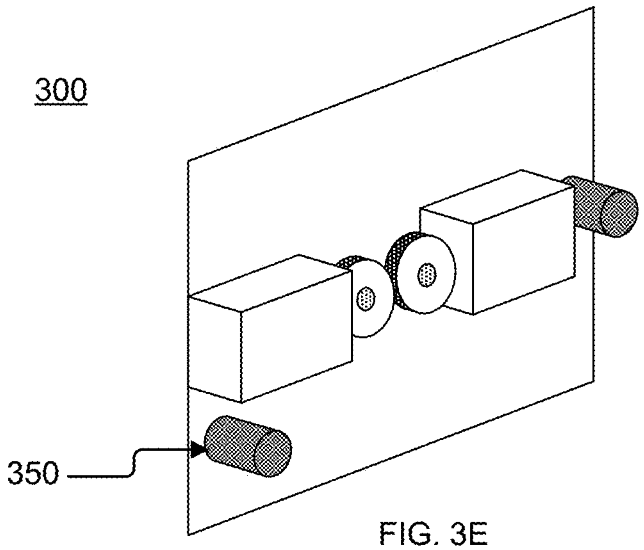
FIG. 3E illustrates an exemplary interchangeable door panel, according to some embodiments of the present disclosure.
Figure 3F:
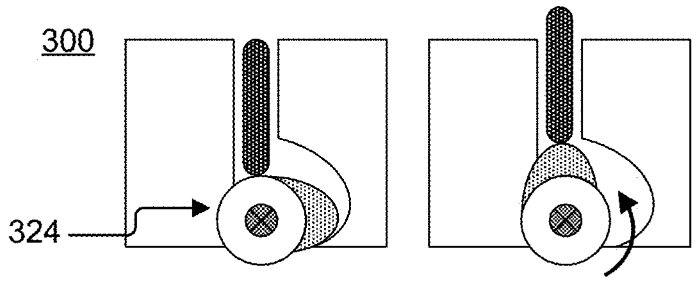
FIG. 3F illustrates an exemplary locking pin, according to some embodiments of the present disclosure.
Figure 3G:
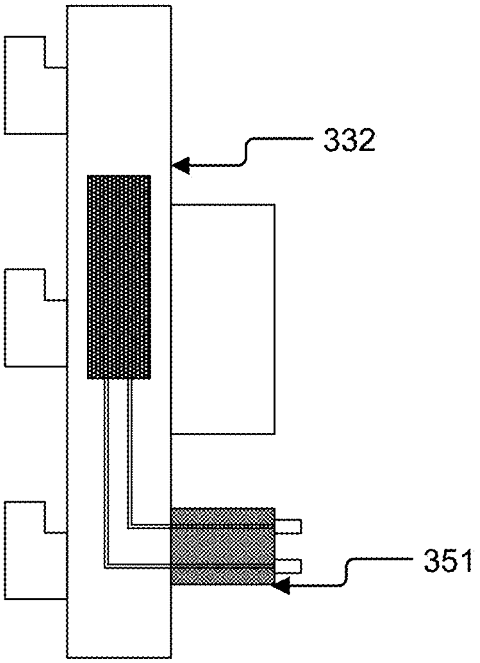
FIG. 3G illustrates an exemplary interchangeable door panel comprising electrical interfaces, according to some embodiments of the present disclosure.
Figure 3H:
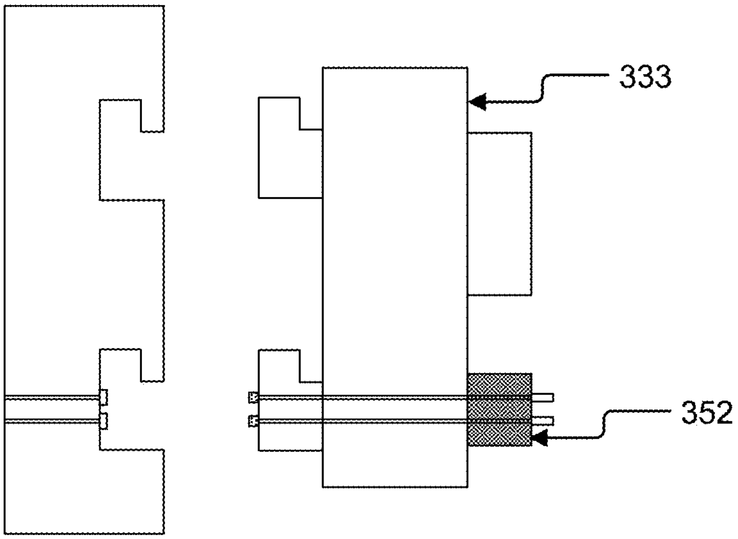
FIG. 3H illustrates an exemplary interchangeable door panel comprising electrical interfaces, according to some embodiments of the present disclosure.

Referring now to FIGS. 3G-H, an exemplary interchangeable door panel 332, 333 comprising electrical interfaces, according to some embodiments of the present disclosure, is illustrated. In some aspects, the interchangeable door panel 332, 333 may provide external electrical interfaces for one or more electronic devices 351, 352 within the panel 332, 333. By way of example and not limitation, the electronic device 351, 352 may comprise one or more electric cables or data cords that may connect to an external source wherein alignment of the connection may be required to function properly. In some embodiments, at least one power supply cable may extend to the electronic device 351, 352 from one or more flexible hoses installed over the hinges or through the door frame. In some implementations, the cables may run through the door via one or more insulated conduits that are already configured within the insertion mechanisms 320.

In some aspects, the power supply for the electronic device 351, 352 may comprise one or more batteries installed inside the panels 332, 333. In some embodiments, a small step-down transformer may reduce the voltage for power consumption of digital and electrical devices embedded inside the door structure and panels 332, 333. As a non-limiting illustrative example, the door structure may be designed with built in conduits and push-in male-female sockets. When the panels 332, 333 are inserted, the socket at the inbound side of the panel may click into the socket inside the door facing the panel 332, 333.

Figure 4A:
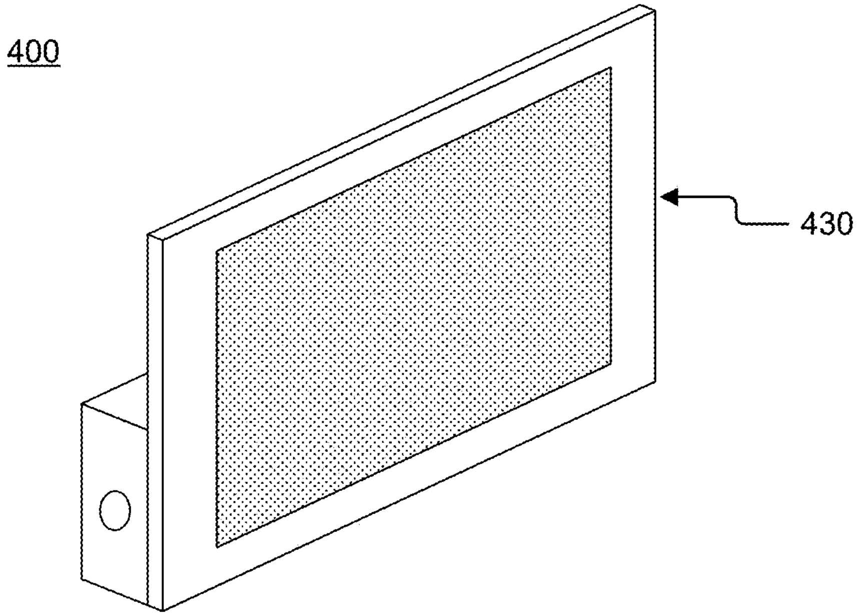
FIG. 4A illustrates a front view of an exemplary interchangeable door panel, according to some embodiments of the present disclosure.
Figure 4B:
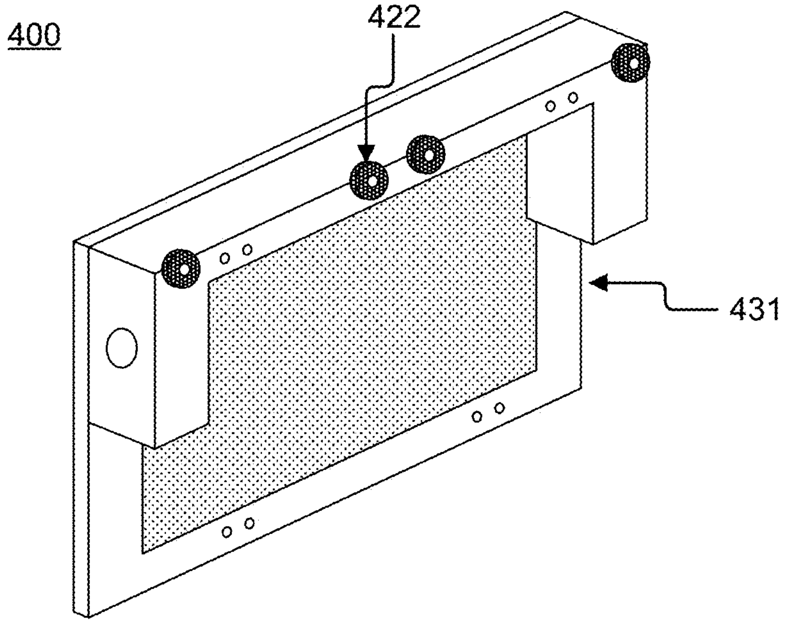
FIG. 4B illustrates a rear view of an exemplary interchangeable door panel, according to some embodiments of the present disclosure.
Figure 4C:
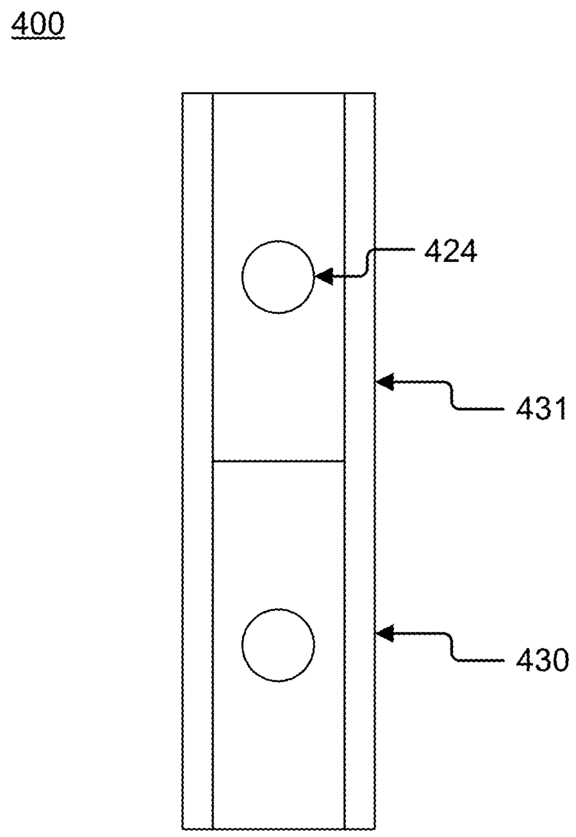
FIG. 4C illustrates a side view of an exemplary interchangeable door panel, according to some embodiments of the present disclosure.

Referring now to FIGS. 4A-C, an exemplary interchangeable door panel 430, 431, according to some embodiments of the present disclosure, is illustrated. In some embodiments, the panel 430, 431 may comprise one or more guide pins 422. In some implementations, the panel 430, 431 may comprise one or more locking pins 424.

In some aspects, the panels 430, 431 may interface with each other. In some embodiments, the shapes of the panels 430, 431 may complement each other or correspond to each other. In some implementations, guide pins 422 may facilitate alignment between the panels 430, 431 and a door. In some aspects, the locking pins 424 may maintain that alignment between the panels 430, 431 and the door.

As a non-limiting illustrative example, a panel 430 may comprise an electronic device or an insertable display that requires additional depth that extends into a cavity within the door. However, if the panel 430 occupies the middle portion of the door, the opposite side of the door is inevitably exposed to a risk of an imperfect seal or gaps if the fit of the extended side of the extruded display is not completely flush with the surface of the opposite side of the door. A second panel 431 may fill unused space in the cavity of the door and provide a complimentary, flush surface for the opposite side of the door.

Figure 5A:
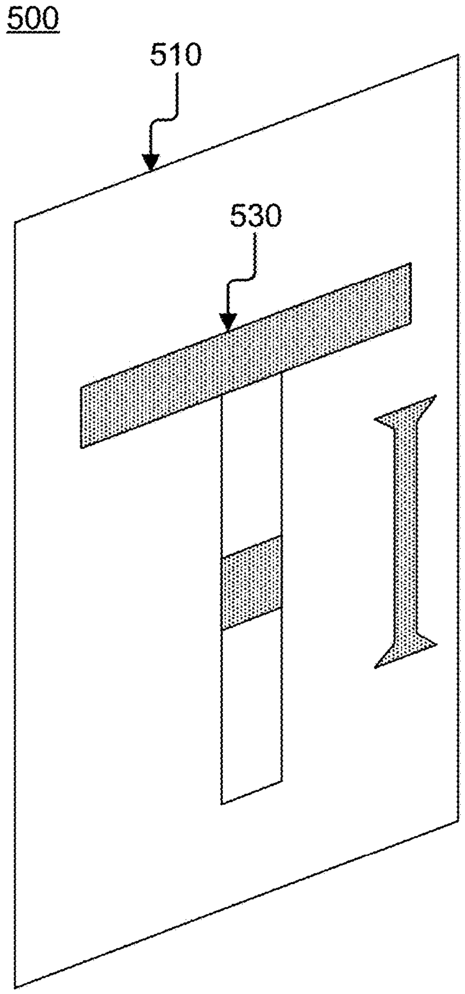
FIG. 5A illustrates an exemplary door of an interchangeable door system comprising a plurality of interchangeable door panels, according to some embodiments of the present disclosure.
Figure 5B:
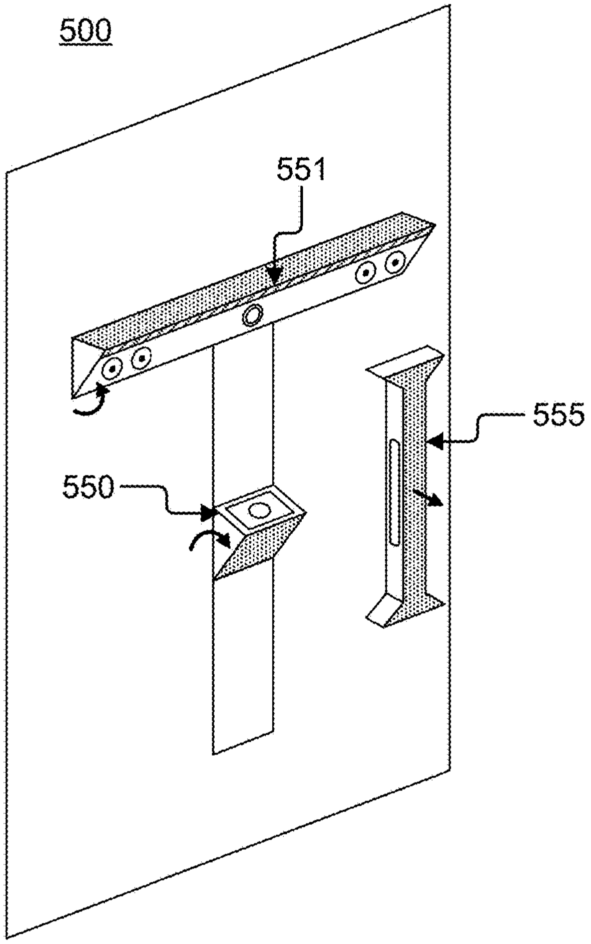
FIG. 5B illustrates an exemplary door of an interchangeable door system comprising a plurality of interchangeable door panels, according to some embodiments of the present disclosure.

Referring now to FIGS. 5A-B, an exemplary door 510 of an interchangeable door system 500, comprising a plurality of interchangeable door panels 530, according to some embodiments of the present disclosure, is illustrated. In some embodiments, the panels 530 may comprise one or more electronic devices 550, 551. In some implementations, the door or panels may comprise at least one interactive device 555.

In some aspects, the electronic devices 550, 551 may be extendable. As a non-limiting illustrative example, a camera and set of one or more LED lights or other light emitting devices for observatory security may remain flush with the door 510 until a person is detected when approaching the door 510. The panel 530 comprising the camera and LED lights may extend from the door 510 as the person approaches to improve visibility. In some aspects, the retracted state of the electronic devices 550, 551 may provide a more aesthetic appearance and conceal the security functionality from people with harmful intentions.

In some embodiments, the electronic devices 550, 551 may provide a form of security identification. In some implementations, the electronic devices 550, 551 may comprise interactive security components such as a retinal or other biometric scanner, a speaker or other audio emitting device, a microphone, a fingerprint pad, or a touch pad, by way of example and not limitation. In some aspects, the interactive security components may interact with one or more security systems connected to other portions of a residence or may operate as a standalone security feature.

In some embodiments, the door 510 may comprise one or more panels 530 that span a plurality of insertion mechanisms. In some implementations, such panels 530 may comprise a vertical alignment. In some aspects, the panels 530 may comprise at least one interactive device 555.

As a non-limiting illustrative example, a panel 530 comprising an extrudable handle may attach to the door 510 via atop, middle, and bottom insertion mechanism. In an inactive state, the handle may remain in a retracted state, wherein the handle is flush with the surface of the door 510. As a user approaches the door and completes a security verification, the handle may extend from the surface of the door 510, allowing the user to use it to open the door 510 and enter a home or other building. In some embodiments, the interactive device 555 may provide additional security and aesthetic attributes to the door 510.

Figure 6A:
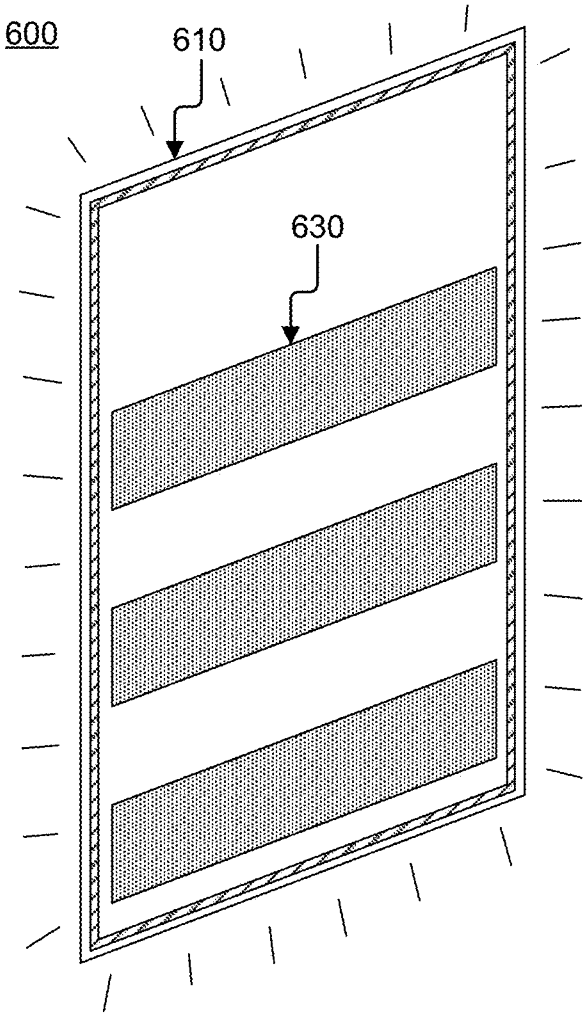
FIG. 6A illustrates an exemplary door of an interchangeable door system comprising a plurality of interchangeable door panels, according to some embodiments of the present disclosure.
Figure 6B:
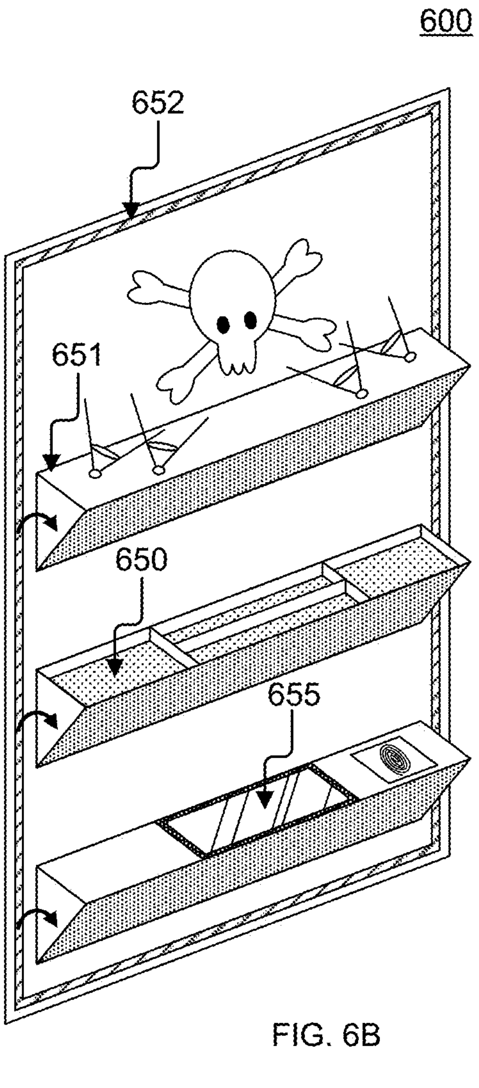
FIG. 6B illustrates an exemplary door of an interchangeable door system comprising a plurality of interchangeable door panels, according to some embodiments of the present disclosure.
Figure 7A:
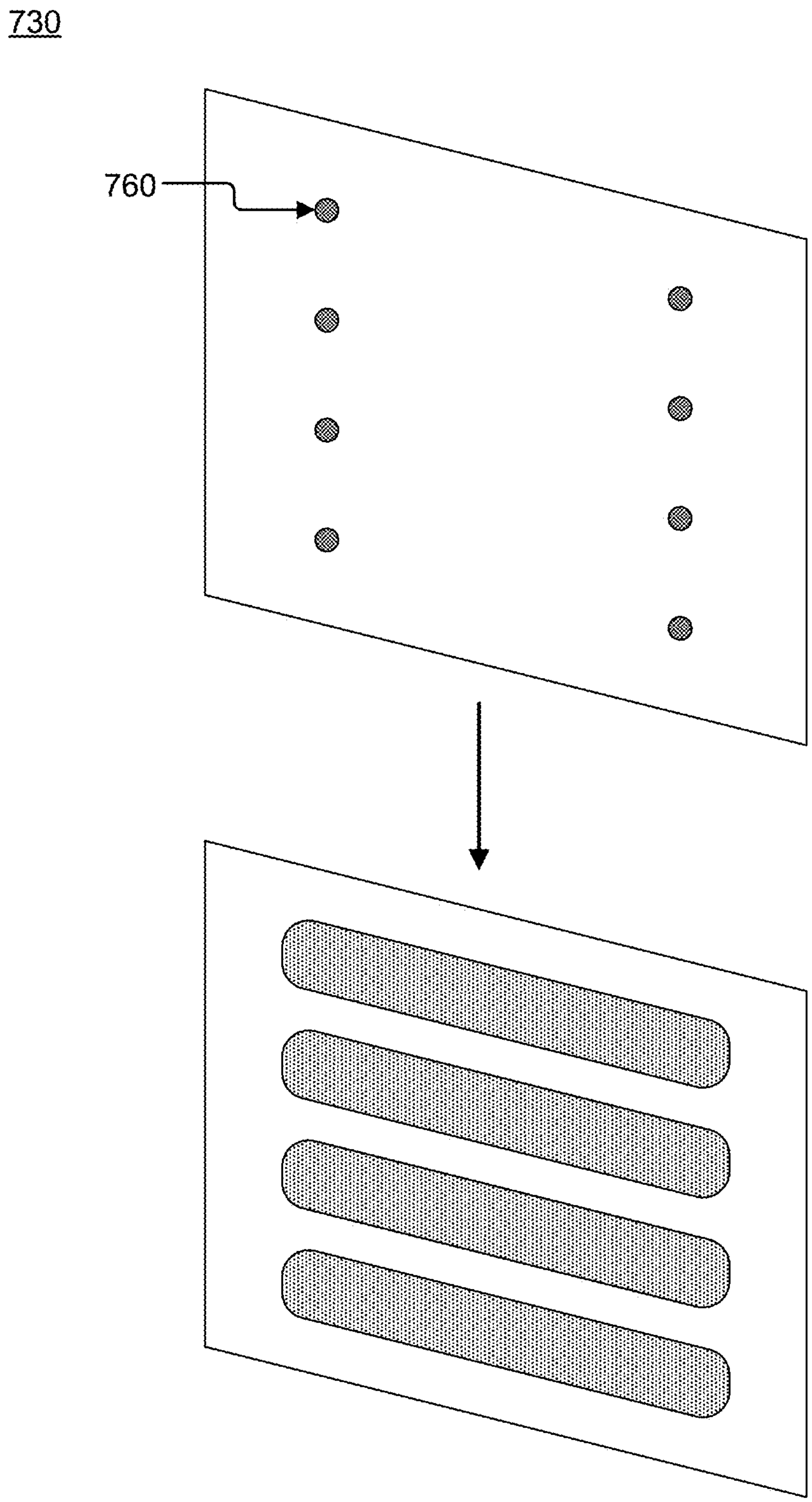
FIG. 7A illustrates an exemplary interchangeable door panel, according to some embodiments of the present disclosure.
Figure 7B:
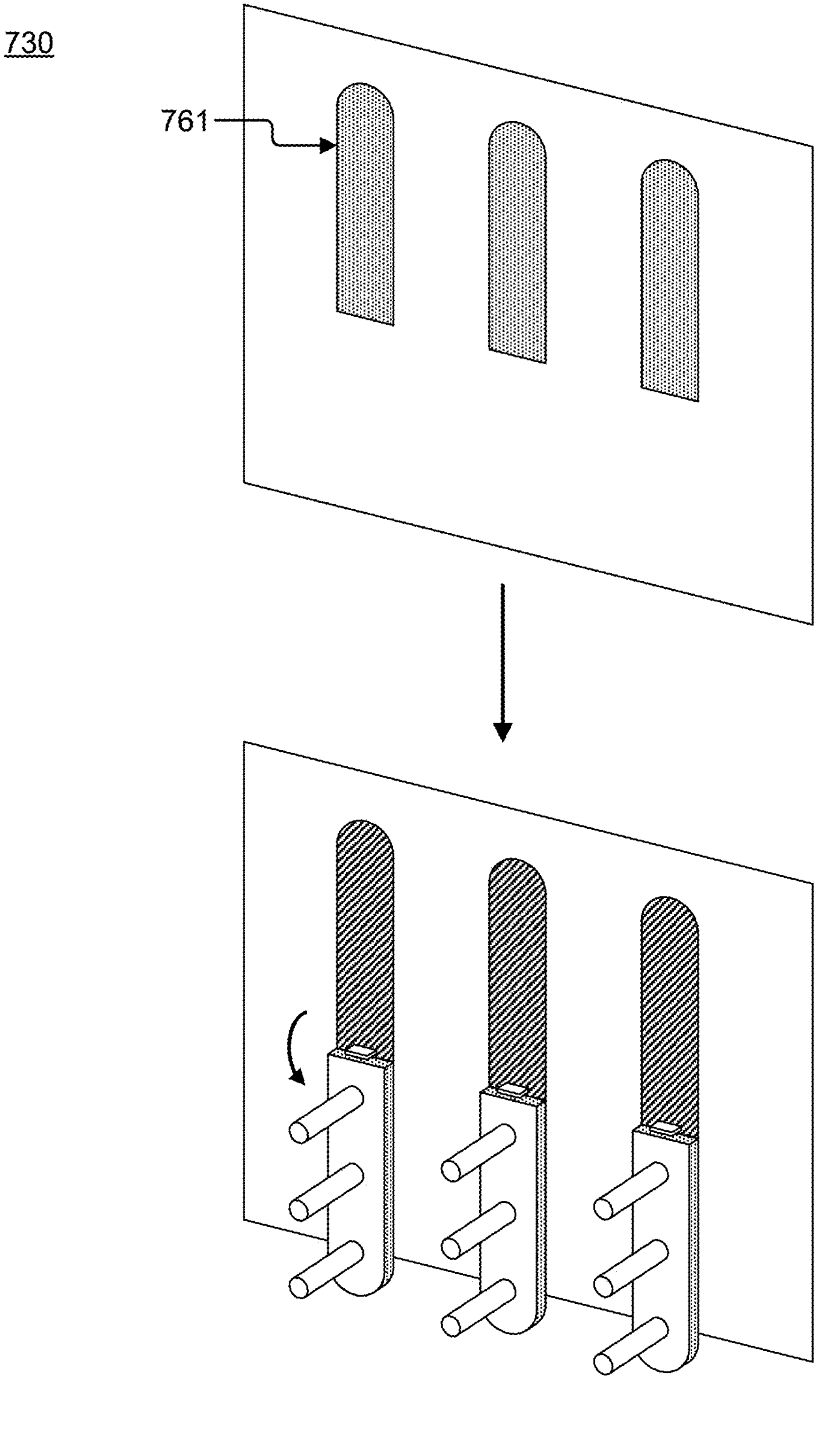
FIG. 7B illustrates an exemplary interchangeable door panel, according to some embodiments of the present disclosure.
Figure 7C:
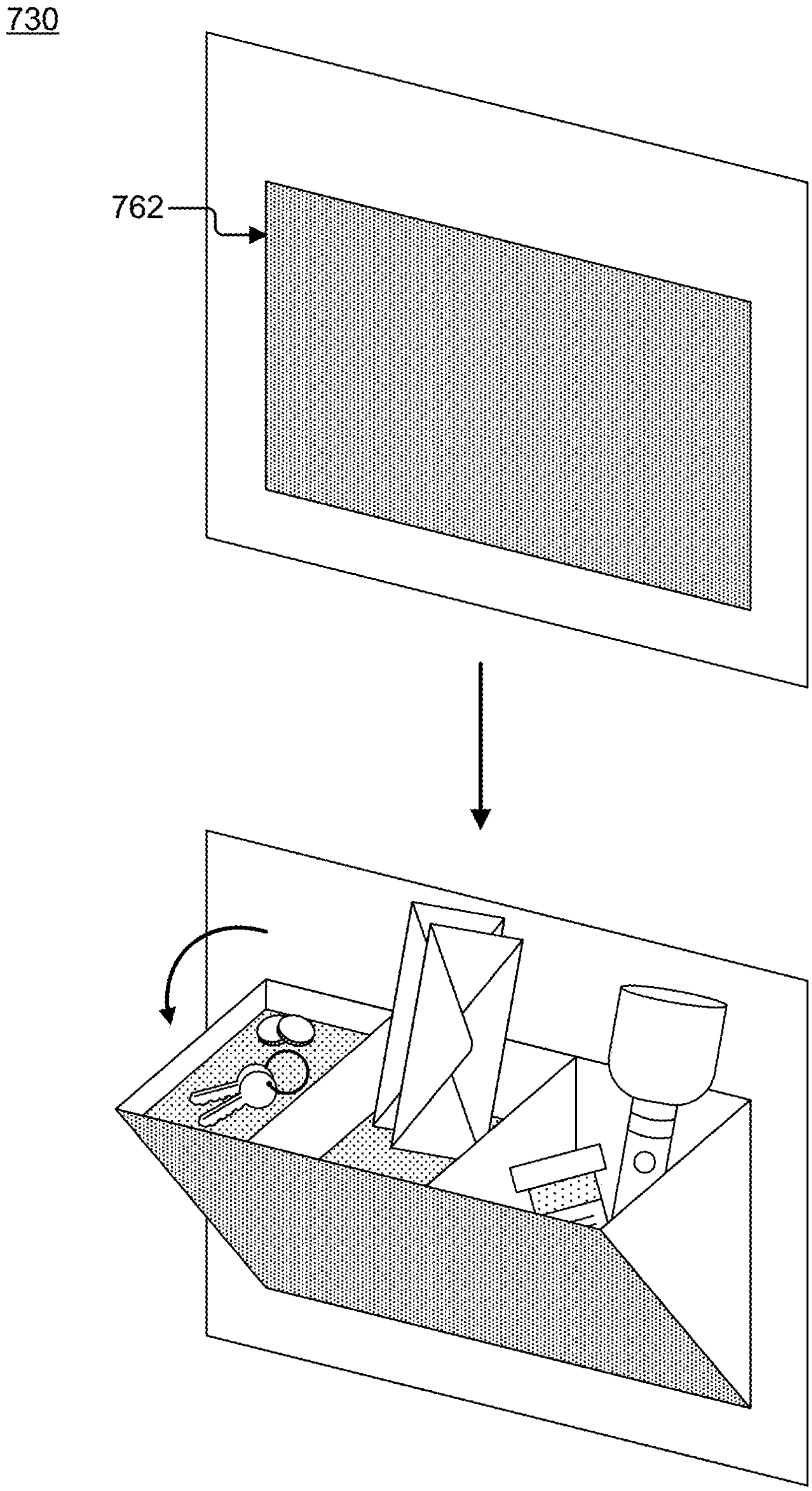
FIG. 7C illustrates an exemplary interchangeable door panel, according to some embodiments of the present disclosure.
Figure 7D:
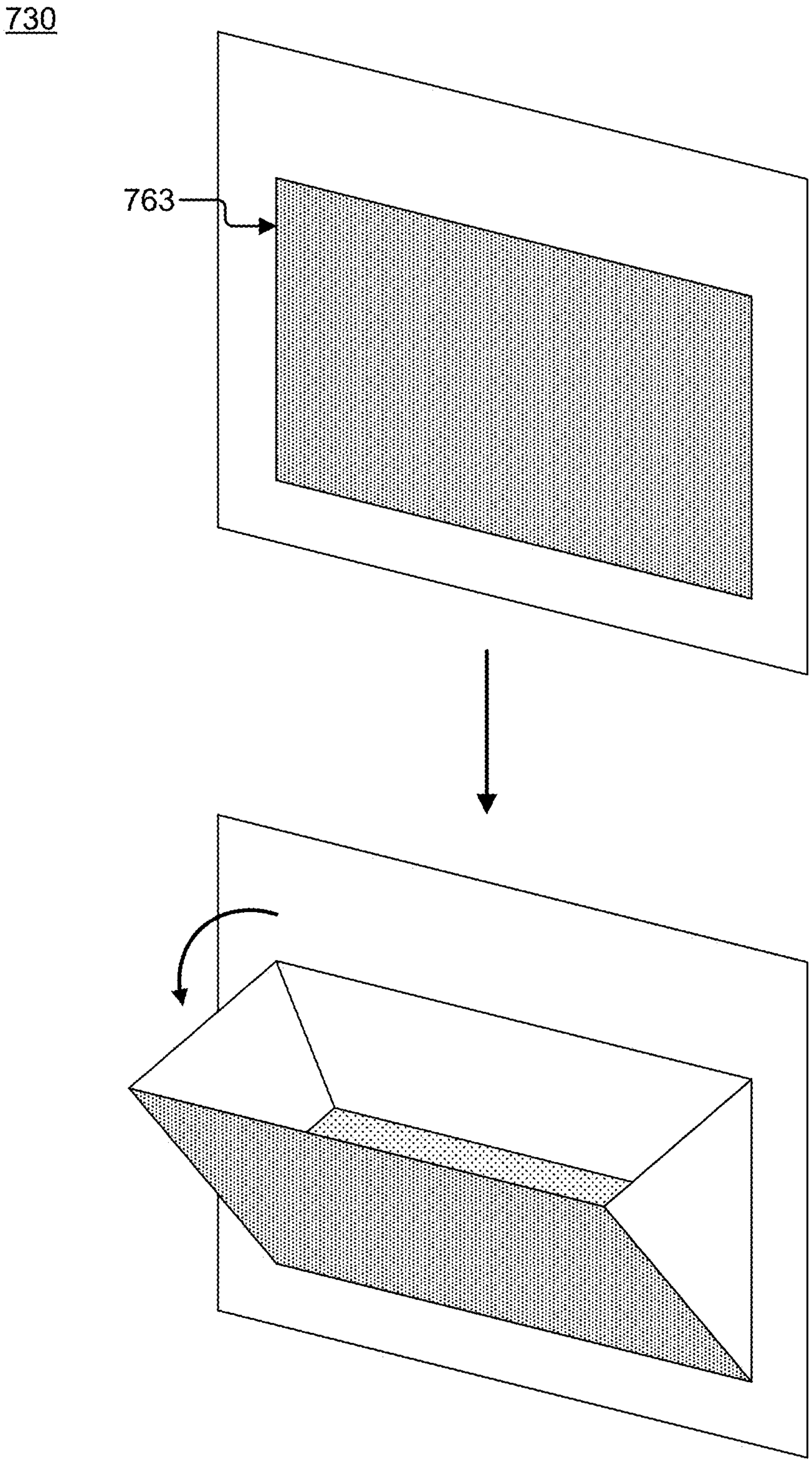
FIG. 7D illustrates an exemplary interchangeable door panel, according to some embodiments of the present disclosure.
Figure 7E:
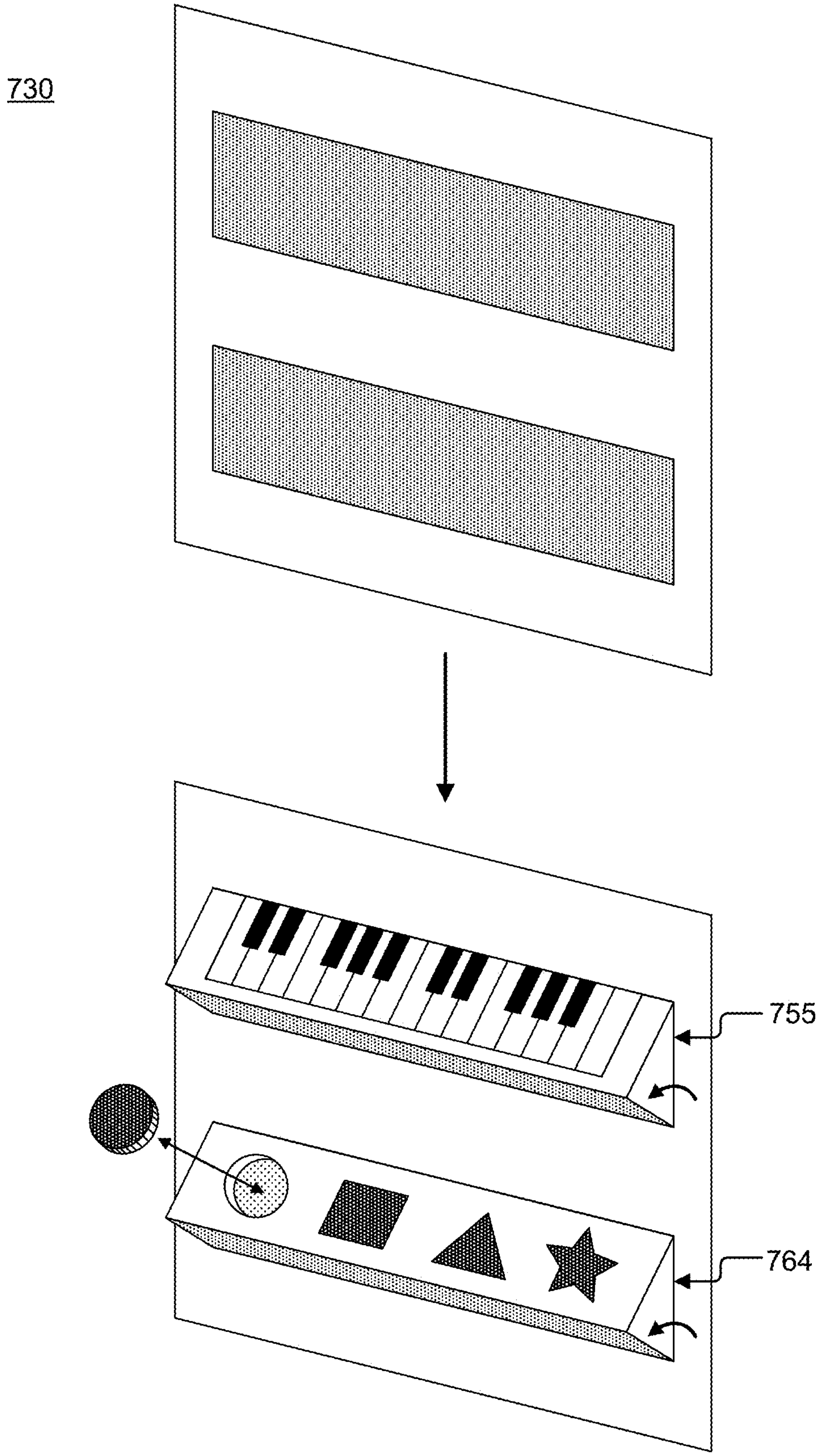
FIG. 7E illustrates an exemplary interchangeable door panel, according to some embodiments of the present disclosure.

Referring now to FIGS. 6A-B, an exemplary door 610 of an interchangeable door system 600 comprising a plurality of interchangeable door panels 630, according to some embodiments of the present disclosure, is illustrated. In some embodiments, the panels 630 may comprise one or more electronic devices 650, 651, 652. In some implementations, the door 610 or panels 630 may comprise at least one interactive device 655.

In some aspects, the door 610 may comprise an electronic device 652. In some embodiments, the electronic device 652 may respond to interactions with the door 610 or the panels 630. In some implementations, the electronic device 652 may comprise sensing capabilities to activate when in proximity to a person, such as when a person approaches the door 610, by way of non-limiting example.

In some aspects, the electronic devices 650, 651 may be extendable. As a non-limiting illustrative example, a set of LED lights that project an image or animation may remain flush with the door until a person is detected when approaching the door 610. The panel 630 comprising the LED lights may extend from the door 610 as a person approaches, and a musical soundtrack may start playing. In some aspects, the retracted state of the electronic devices 650, 651 may provide a more aesthetic appearance when not in use.

In some embodiments, the panel 630 may comprise at least one interactive device 655. In some aspects, the interactive device 655 may provide a form of security identification. In some implementations, the interactive device 655 may comprise one or more interactive security components such as a retinal scanner, speaker, microphone, fingerprint pad, or touch pad, by way of example and not limitation. In some aspects, the interactive security components may be configured to interact with security systems connected to other portions of a residence or may operate in a standalone configuration.

In some embodiments, the interactive device 655 may comprise an interface for interacting with the door 610, another user, or a prerecorded program, as non-limiting examples. In some implementations, the interactive device 655 may be used to modify the settings of the electronic devices 650, 651.

Referring now to FIGS. 7A-E, a plurality of exemplary interchangeable door panels 730, according to some embodiments of the present disclosure, are illustrated. In some embodiments, each of the panels 730 may comprise one or more storage devices 760, 761, 762, 763, 764. In some implementations, each panel 730 may comprise at least one interactive device 755.

In some aspects, the storage device 760 may comprise one or more holes or recessed grooves. In some embodiments, the storage device 760 may comprise at least one strap that fastens to the door by being inserted into the holes. In some implementations, the strap may provide a mechanism from which to hang one or more objects. In some aspects, the holes may comprise a universal size that allows one or more of a plurality of various objects to fasten to the holes.

In some embodiments, the storage device 761 may be configured to be altered between an open and closed state. In some implementations, the storage device 761 may comprise one or more pegs or other protrusions from which to hang objects. By way of example and not limitation, a plurality of pegs, in a closed state, may remain embedded within at least one cavity within a door, with the surface of the pegs remaining flush with the surface of the door. When altered to the open state, the pegs may extend from the surface of the door to provide hanging surfaces for one or more external objects. In some aspects, the pegs may comprise one or more of a plurality of positions, such as, for example and not limitation, perpendicular to the surface of the door or at a 30-degree angle relative to the surface of the door, to hang a larger variety of objects from the storage device 761.

In some embodiments, the storage device 762, 763 may comprise at least one drawer or empty cavity in which to store one or more objects. In some implementations, the storage device 762 may comprise a plurality of smaller storage sections to further organize objects placed within the storage object 762.

In some aspects, the panel 730 may comprise at least one interactive device 755. In some embodiments, the storage device 764 may comprise one or more objects intended to remain within the storage device 764 for interactive purposes. As a non-limiting illustrative example, the panel 730 may be configured to entertain children and may comprise a small toy piano for the children to play. In some implementations, the panel 730 may comprise a plurality of shapes that may be removed and reinserted into matching shape inserts.

Figure 8A:
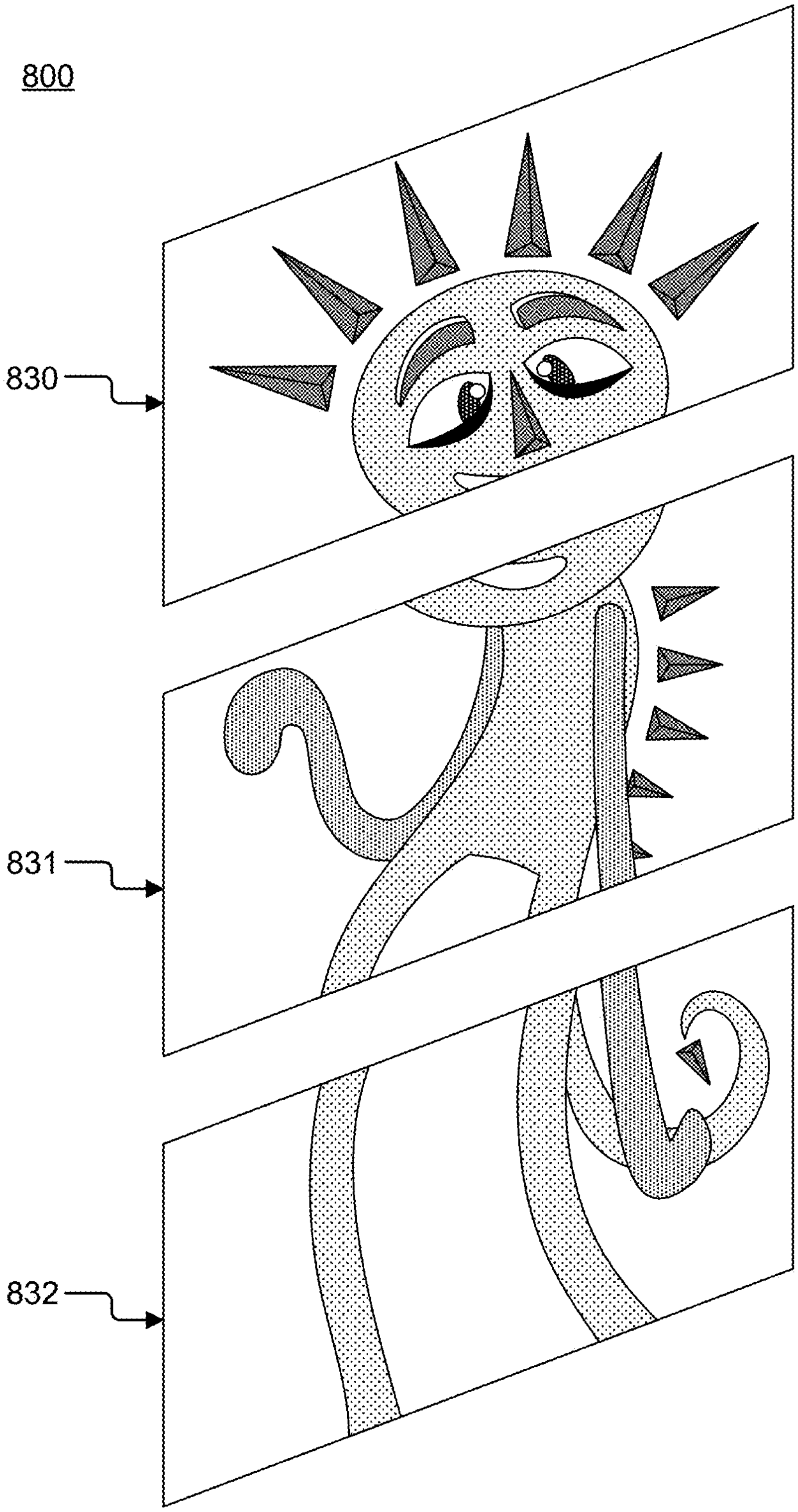
FIG. 8A illustrates a plurality of exemplary interchangeable door panels, according to some embodiments of the present disclosure.
Figure 8B:
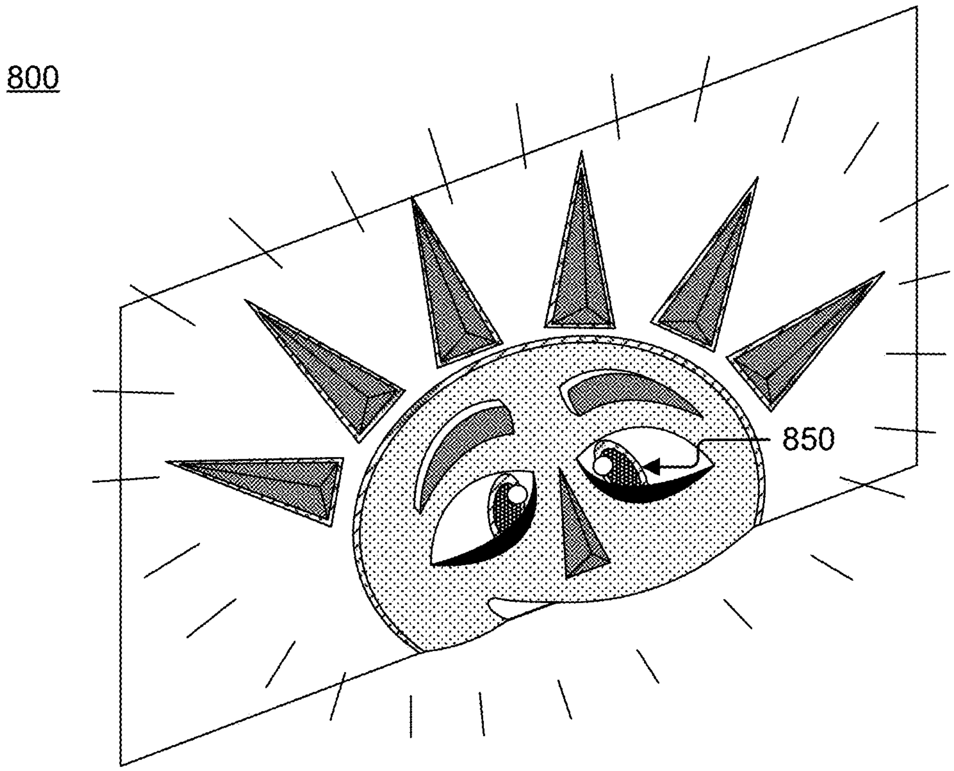
FIG. 8B illustrates an exemplary interchangeable door panel, according to some embodiments of the present disclosure.
Figure 8C:
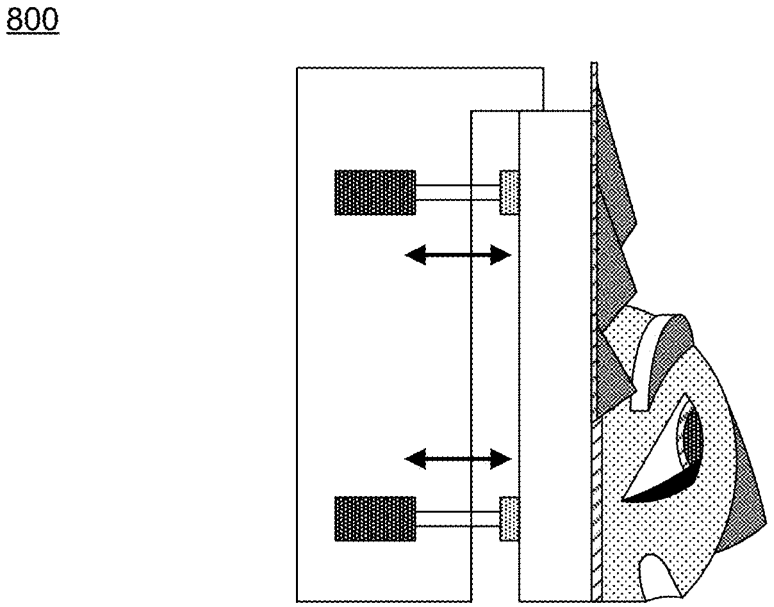
FIG. 8C illustrates an exemplary interchangeable door panel, according to some embodiments of the present disclosure.

Referring now to FIGS. 8A-C, a plurality of exemplary interchangeable door panels 830, 831, 832, according to some embodiments of the present disclosure, are illustrated. In some embodiments, each of the panels 830, 831, 832 may comprise at least one electronic device 850. In some aspects, the panels 830, 831, 832 may comprise portions of a larger unitary image. In some embodiments, when the panels 830, 831, 832 are attached to a door, the panels 830, 831, 832 may form an image.

In some implementations, the formed image may be three dimensional. In some aspects, the formed image may comprise extruded portions, wherein the amount of extrusion may be adjustable. For example, lead screws may be adjusted from the side of the panel 830 to extend a portion of the formed image. In some embodiments, the panel 830 may comprise at least one electronic device 850 that interfaces with the formed image, such as LED lights that illuminate at least a portion of the formed image, by way of example and not limitation.

Figure 9:
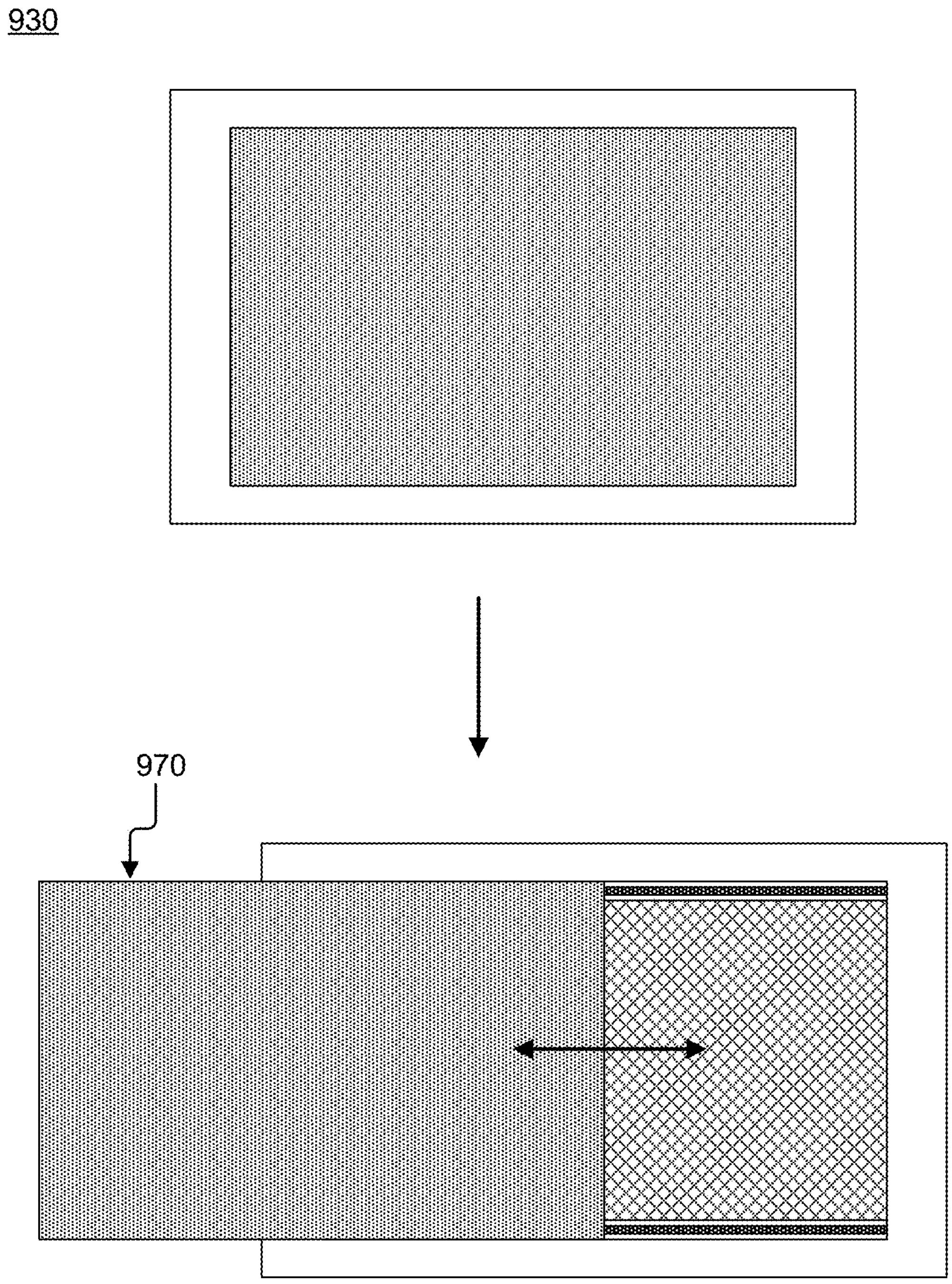
FIG. 9 illustrates an exemplary interchangeable door panel, according to some embodiments of the present disclosure.

Referring now to FIG. 9, an exemplary interchangeable door panel 930, according to some embodiments of the present disclosure, is illustrated. In some embodiments, the panel 930 may comprise at least one cover 970. In some implementations, the panel 930 may comprise at least one substantially hollow portion. In some aspects, the hollow portion may facilitate interaction between both sides of the interchangeable door panel 930. In some embodiments, the cover 970 may facilitate interaction availability.

As a non-limiting illustrative example, the panel 930 may comprise a screen or similar structural configuration that allows visitors to communicate with residents of a home while remaining outside of a closed door. The screen may be physically blocked by a cover 970 when not in use, wherein the cover 970 may be retracted when the use of the screen portion is desired to communicate. The cover 970 may preserve the privacy provided by an entryway door outside of interactive situations with visitors.

Figure 10:
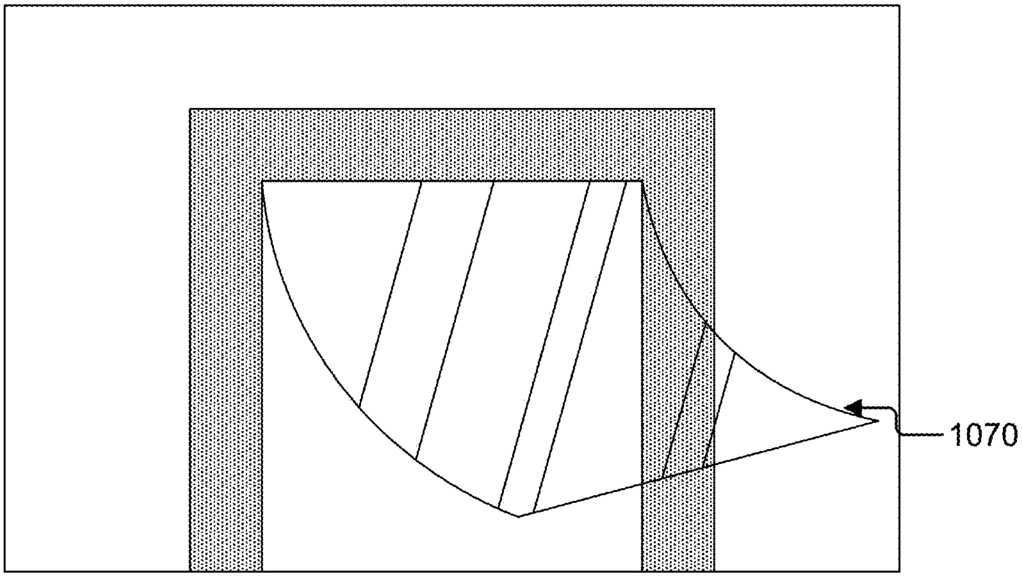
FIG. 10 illustrates an exemplary interchangeable door panel, according to some embodiments of the present disclosure.

Referring now to FIG. 10, an exemplary interchangeable door panel 1030, according to some embodiments of the present disclosure, is illustrated. In some embodiments, the panel 1030 may comprise at least one cover 1070. In some implementations, the panel 1030 may comprise at least one substantially hollow portion. In some aspects, the hollow portion may provide a secondary entrance into a residence or other building through the interchangeable door panel 1030. In some embodiments, the cover 1070 may facilitate entrance availability.

As a non-limiting illustrative example, the panel 1030 may comprise an animal door to allow dogs, cats, or other pets to enter or exit a residence. At nighttime, the user may prevent exit or entrance through the animal door by securing the cover 1070. As an additional non-limiting illustrative example, the panel 1030 may comprise at least one movable portion configured to rotate about at least one axis via at least one hinge to be altered between a closed position and an open position, wherein an opening within the panel 1030 may be established when the movable portion is in the open position such that one or more packages, foodstuffs, or similar items may be passed through the opening without opening the door to which the panel 1030 may be attached. In some embodiments, at least one actuator, such as, for example and not limitation, a piston-driven rod or a mechanical arm or lever, may facilitate the transition of the movable portion between the open and closed positions. In some implementations, one or more sensing devices may be integrated with the panel 1030 such that the sensing devices may detect when an approved animal (such as, for example and not limitation, a household pet) is approaching the panel 1030 or when an approved human is approaching with an item for delivery and thereby utilize such detection to automatically open the movable portion of the panel 1030 to facilitate pet ingress or egress or item delivery without having to disrupt the user.

Figure 11:
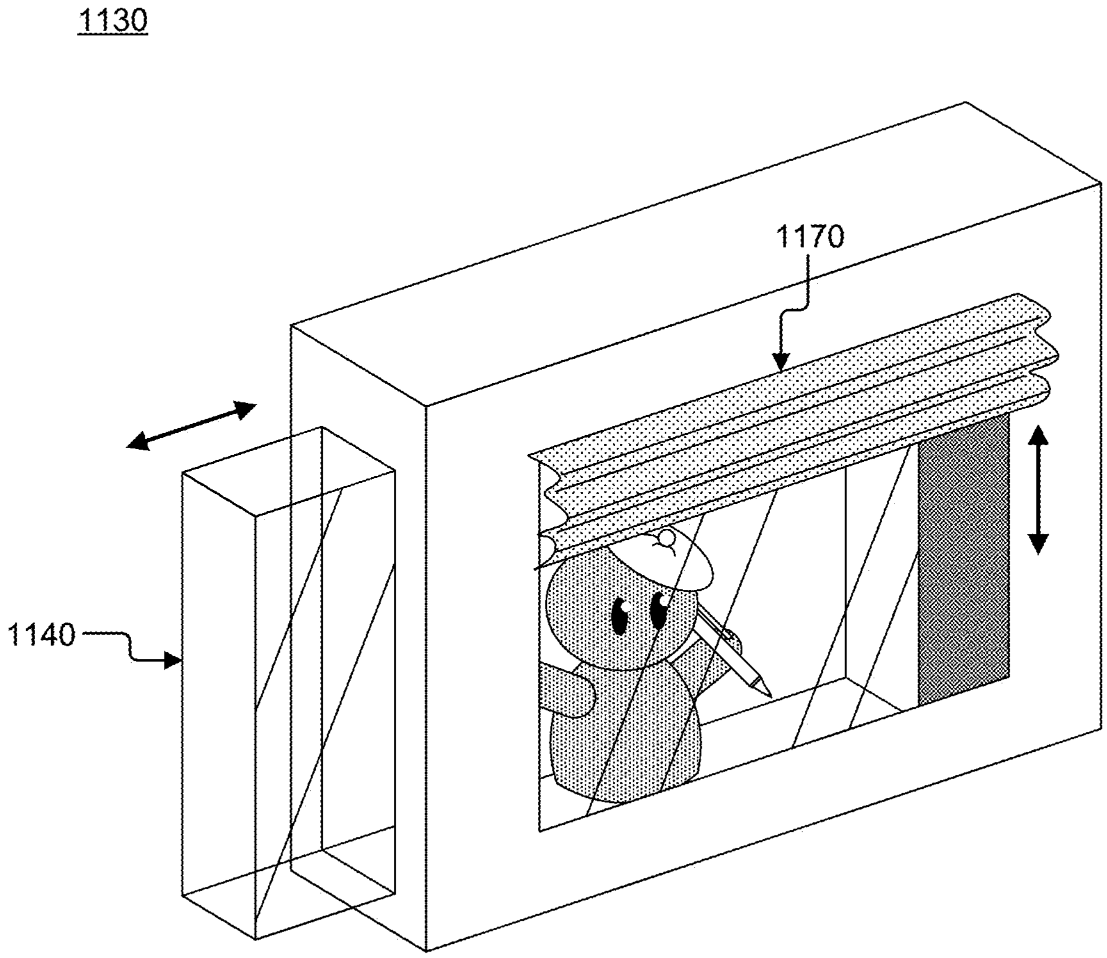
FIG. 11 illustrates an exemplary interchangeable door panel comprising an insert, according to some embodiments of the present disclosure.

Referring now to FIG. 11, an exemplary interchangeable door panel 1130 comprising an insert 1140, according to some embodiments of the present disclosure, is illustrated. In some embodiments, the panel 1130 may comprise at least one cover 1170. In some implementations, the panel 1130 may comprise at least one insert 1140. In some aspects, the panel 1130 may comprise at least one substantially hollow portion.

In some embodiments, an insert 1140 may at least temporarily occupy at least a portion of the hollow portion of the panel 1130. In some implementations, the insert 1140 may be removable. In some aspects, the insert 1140 may be interchangeable. In some embodiments, the insert 1140 may comprise at least one at least partially transparent portion. In some implementations, the cover 1170 may provide privacy while displaying an insert 1140.

As a non-limiting illustrative example, an insert 1140 may comprise a prominent figurine that is displayed in an epoxy casing. On the interior side of the interchangeable door panel, a resident may keep the cover 1170 closed to prevent visitors from looking through the epoxy and seeing inside the residence.

Figure 12A:
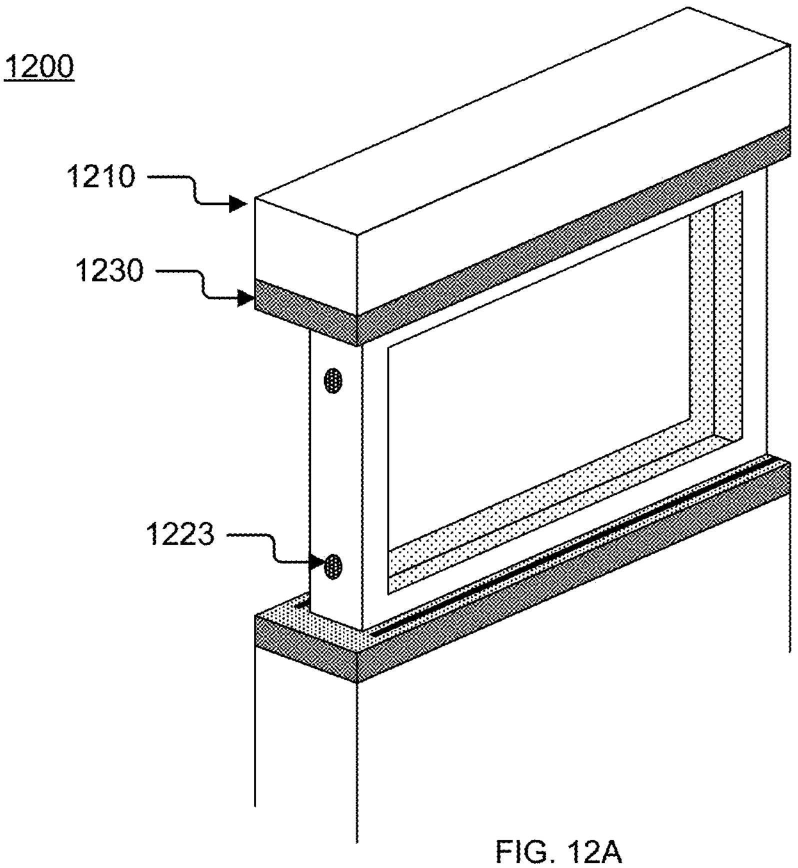
FIG. 12A illustrates an exemplary interchangeable door system comprising a door comprising an interchangeable door panel, according to some embodiments of the present disclosure.
Figure 12B:
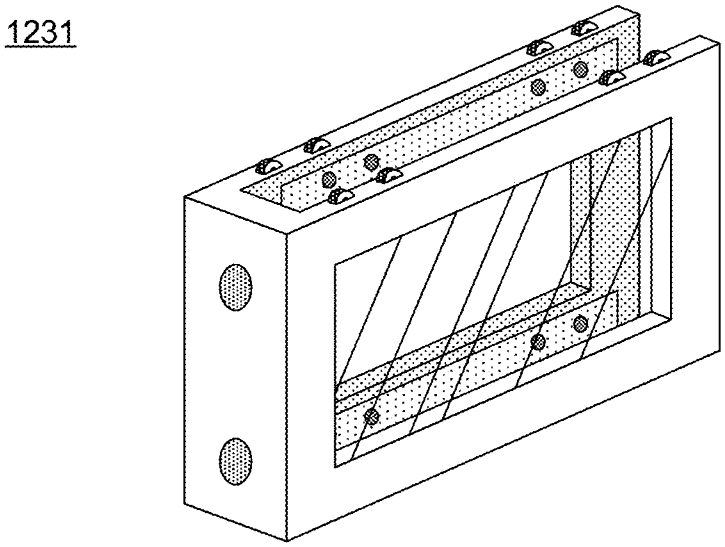
FIG. 12B illustrates an exemplary interchangeable door system comprising a door comprising an interchangeable door panel, according to some embodiments of the present disclosure.
Figure 12C:
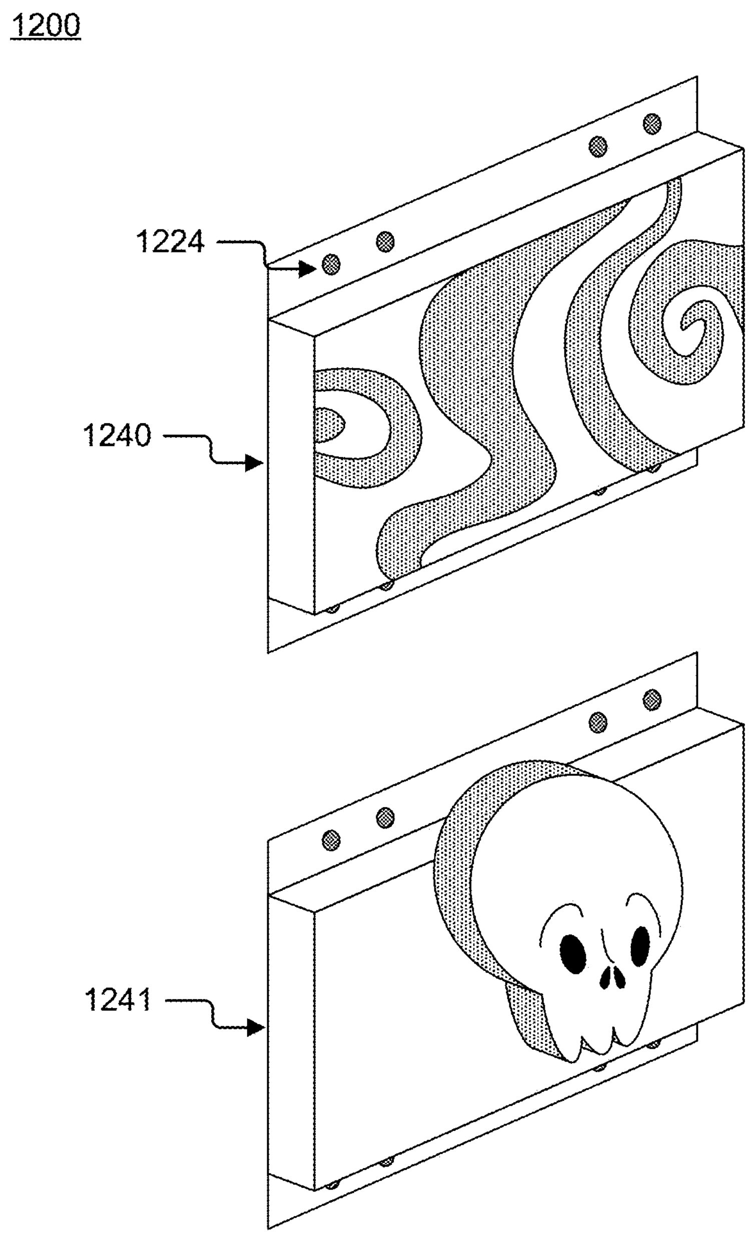
FIG. 12C illustrates a plurality of exemplary inserts for an interchangeable door system, according to some embodiments of the present disclosure.

Referring now to FIGS. 12A-C, various aspects of an interchangeable door system 1200, according to some embodiments of the present disclosure, are illustrated. In some aspects, the interchangeable door system 1200 may comprise at least one door 1210. In some embodiments, the door 1210 may comprise at least one interchangeable door panel 1230. In some aspects, the panel 1230 may comprise at least one insert 1240. In some implementations, the panel 1230 may comprise one or more locking pins 1223, 1224.

In some implementations, the panel 1230 may comprise at least one insert 1240. In some aspects, the panel 1230 may comprise at least one substantially hollow portion. In some embodiments, an insert 1240 may at least partially occupy at least a portion of the hollow portion of the panel 1230. In some implementations, the insert 1240 may be removable. In some aspects, the insert 1240 may be interchangeable.

In some embodiments, the panel 1230 may comprise a frame to interface with the insert 1240, 1241. In some implementations, the panel 1230, 1231 may comprise one or more locking pins 1223 to at least temporarily secure the panel 1230, 1231 to the door 1210. In some aspects, the insert 1240, 1241 may comprise one or more locking pins 1224 to at least temporarily secure the insert 1240, 1241 to the panel 1230, 1231. In some embodiments, the locking pins 1224 may provide a convenient method of interchangeability to change inserts 1240, 1241.

Figure 13B:
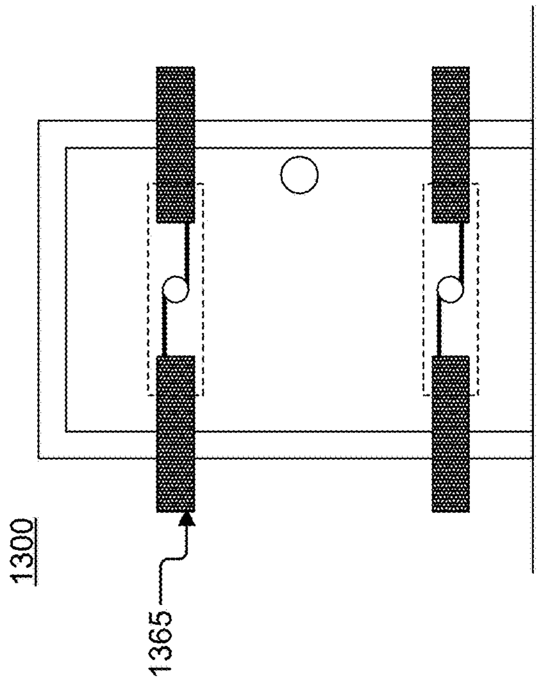
FIG. 13B illustrates an exemplary interchangeable door system comprising a door comprising an interchangeable door panel, according to some embodiments of the present disclosure.
Figure 13A:
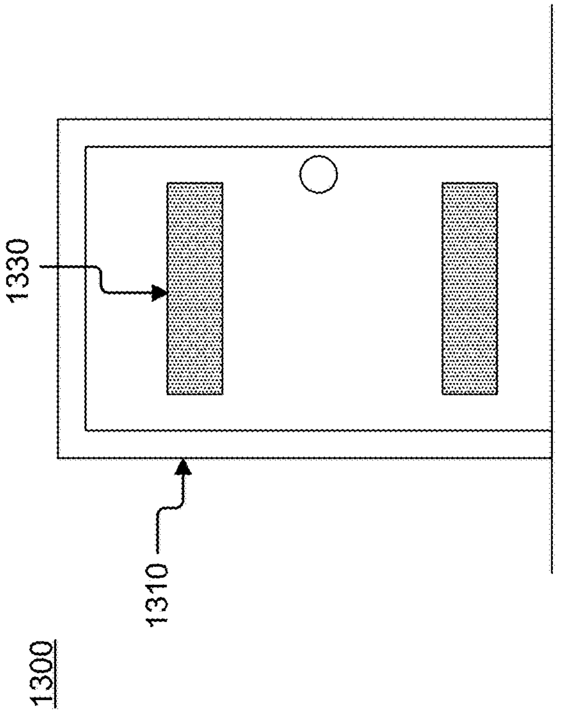
FIG. 13A illustrates an exemplary interchangeable door system comprising a door comprising an interchangeable door panel, according to some embodiments of the present disclosure.
Figure 13C:
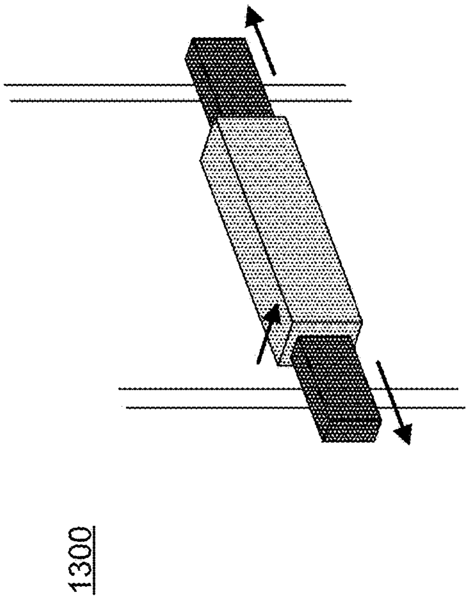
FIG. 13C illustrates an exemplary interchangeable door panel for an interchangeable door system, according to some embodiments of the present disclosure.
Figure 14A:
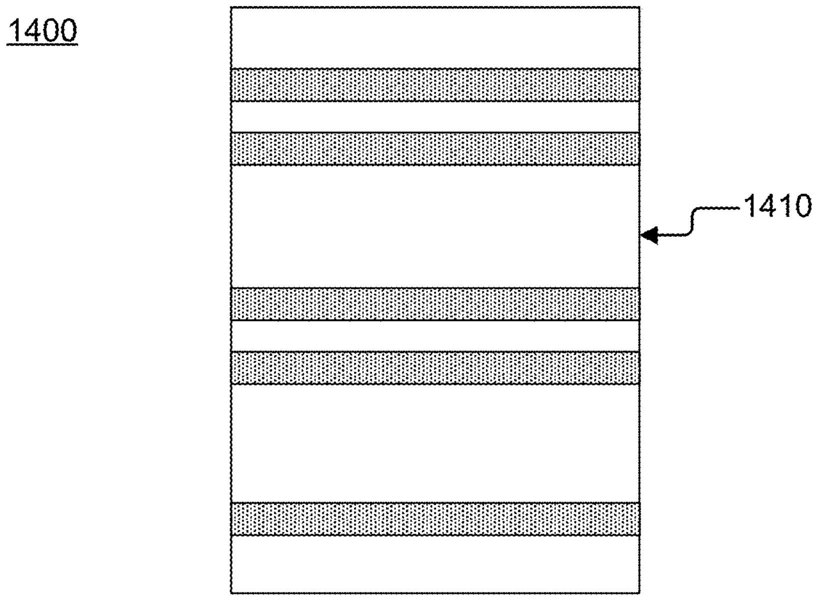
FIG. 14A illustrates an exemplary door for an interchangeable door system, according to some embodiments of the present disclosure.
Figure 14B:
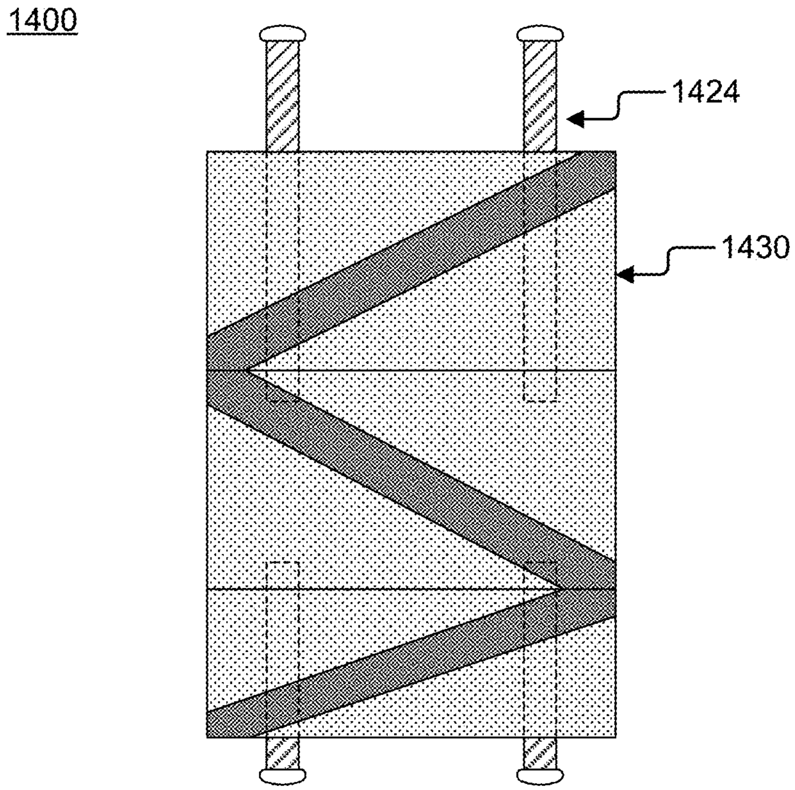
FIG. 14B illustrates an exemplary interchangeable door panel for an interchangeable door system, according to some embodiments of the present disclosure.
Figure 14C:
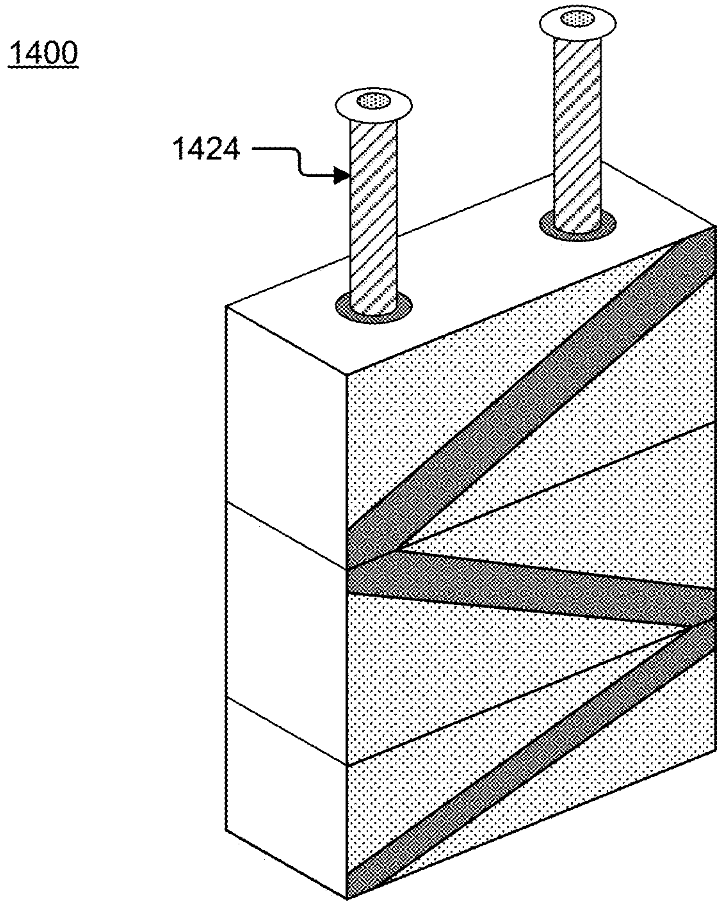
FIG. 14C illustrates a plurality of exemplary interchangeable door panels for an interchangeable door system, according to some embodiments of the present disclosure.
Figure 14D:
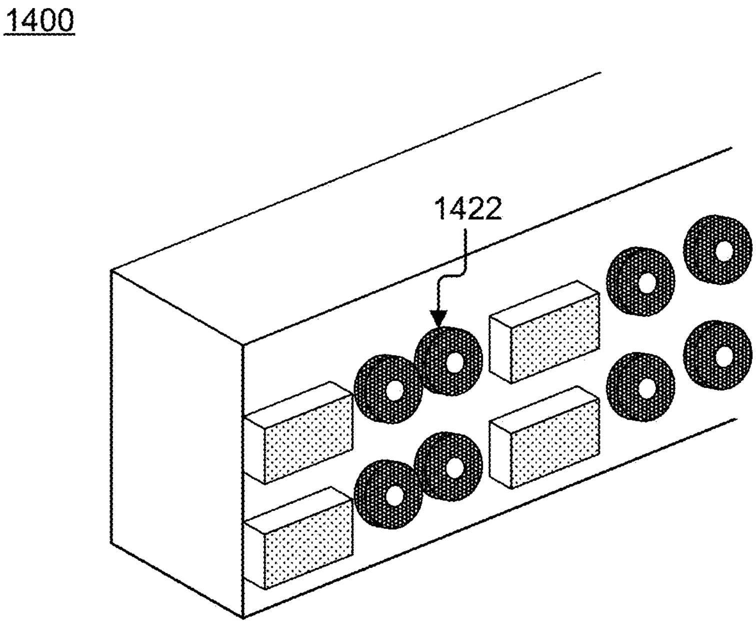
FIG. 14D illustrates an exemplary interchangeable door panel for an interchangeable door system, according to some embodiments of the present disclosure.

Referring now to FIGS. 13A-C, an exemplary interchangeable door system 1300 comprising a door 1310 comprising an interchangeable door panel 1330, according to some embodiments of the present disclosure, is illustrated. In some embodiments, the panel 1330 may comprise at least one securing mechanism 1365. In some implementations, the securing mechanism 1365 may be configured to fortify the door 1310. In some aspects, the securing mechanism 1365 may be configured to extend from the panel 1330 when activated.

As a non-limiting illustrative example, the panel 1330 may comprise a securing mechanism 1365 that comprises a plurality of large metal bars that, when activated, fortify the door 1310 from break-ins by extruding from the panel 1330 to extend beyond the frame of the door 1310, thereby using the walls of the residence or building as reinforcement for maintaining the door 1310 in a closed position.

Referring now to FIGS. 14A-D, an exemplary interchangeable door panel 1430 for an interchangeable door system 1400, according to some embodiments of the present disclosure, is illustrated. In some aspects, the interchangeable door system 1400 may comprise at least one door 1410. In some implementations, the interchangeable door system 1400 may comprise one or more interchangeable panels 1430. In some embodiments, the door 1410 may comprise a plurality of recessed insertion mechanisms to at least temporarily secure the panels 1430 to the door 1410. In some implementations, the panels 1430 may comprise one or more locking pins 1424.

In some aspects, the locking pins 1424 may unify the panels 1430. In some embodiments, the locking pins 1424 may secure a plurality of the panels 1430 to the door 1410. As a non-limiting illustrative example, the panels 1430 may form a reinforced panel block when joined by the locking pins 1424 that may provide a fortified door for added security or storm reinforcement. The locking pins 1424 may unify the panels 1430 sufficiently to transform the panels 1430 into a storm fortification for hurricanes and similar natural disasters. In some implementations, one or more guide pins 1422 may be configured to facilitate securing the panels 1430 in place and aligning the panels 1430 with the door 1410. In some aspects, this may further strengthen the fortification of the panels 1430 attached to the door 1410.

Figure 15A:
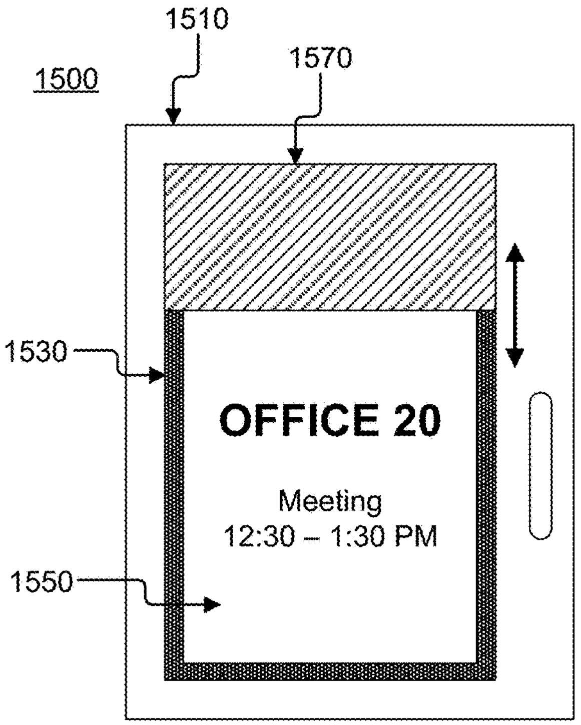
FIG. 15A illustrates an exemplary interchangeable door panel for an interchangeable door system, according to some embodiments of the present disclosure.
Figure 15B:
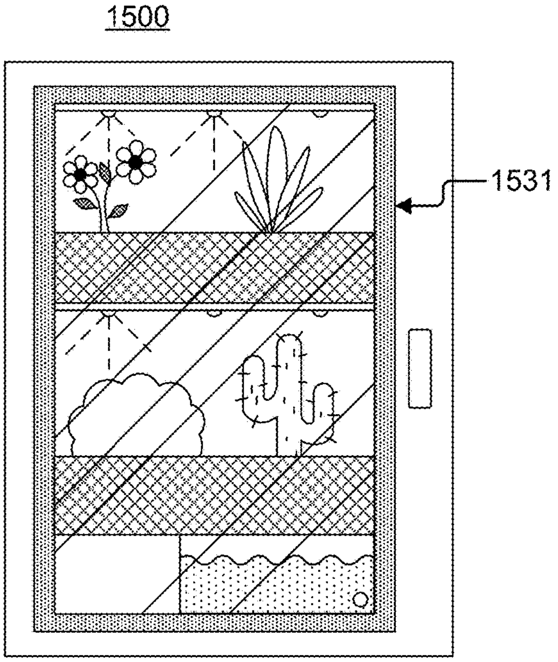
FIG. 15B illustrates an exemplary interchangeable door panel for an interchangeable door system, according to some embodiments of the present disclosure.
Figure 15C:
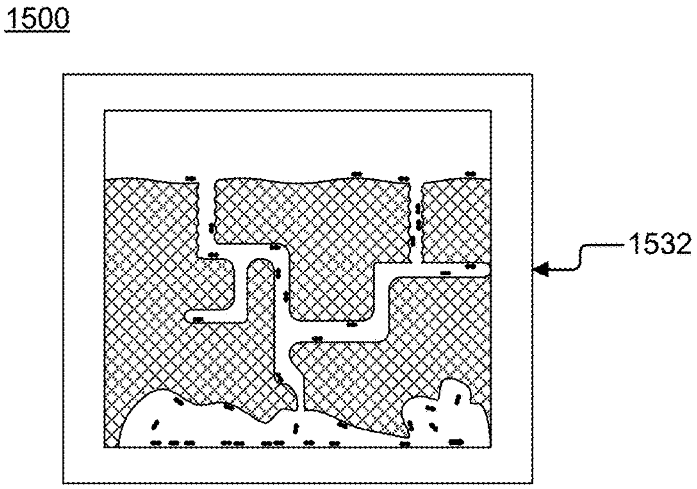
FIG. 15C illustrates an exemplary interchangeable door panel for an interchangeable door system, according to some embodiments of the present disclosure.

Referring now to FIGS. 15A-C, exemplary interchangeable door panels 1530, 1531, 1532 for an interchangeable door system 500, according to some embodiments of the present disclosure, are illustrated. In some embodiments, the interchangeable door system 500 may comprise at least one door 1510. In some implementations, the interchangeable door system 1500 may comprise at least one cover 1570. In some embodiments, the cover 1570 may provide privacy if the insertable door panel 1500 comprises at least one at least partially transparent region.

In some aspects, the interchangeable door system 1500 may comprise one or more panels 1530, 1531, 1532. In some embodiments, the panel 1530 may comprise at least one electronic device 1550. In some implementations, the electronic device 1550 may comprise at least one insert that is configured for interchangeability. In some aspects, the electronic device 1550 may be configured to interface with at least one external device. In some embodiments, the electronic device 1550 may be configured to display information.

As a non-limiting illustrative example, the door 1510 may be configured to facilitate access to a business meeting room, wherein the door 1510 may comprise at least one screen that displays information for the next appointment that will occupy that meeting room. The screen may maintain a remote connection to a computer that routinely updates the schedule on the screen in the event of schedule changes or cancellations. In some aspects, the remote connection may also allow a user to add information to the screen, such as temporary company announcements.

In some implementations, the panel 1531, 1532 may comprise one or more living organisms. By way of example and not limitation, the panel 1531 may comprise a terrarium that provides soil and water for a plurality of plants. Such panel 1531 may be used to create a decorative door 1510 found in an office or workplace. As another non-limiting illustrative example, the panel 1532 may comprise an ant farm that is attached to the door 1510 of a biology classroom. In some aspects, the panel 1531, 1532 may comprise an insert to provide maintenance to the living organisms therein or to switch displays.

Figure 16A:
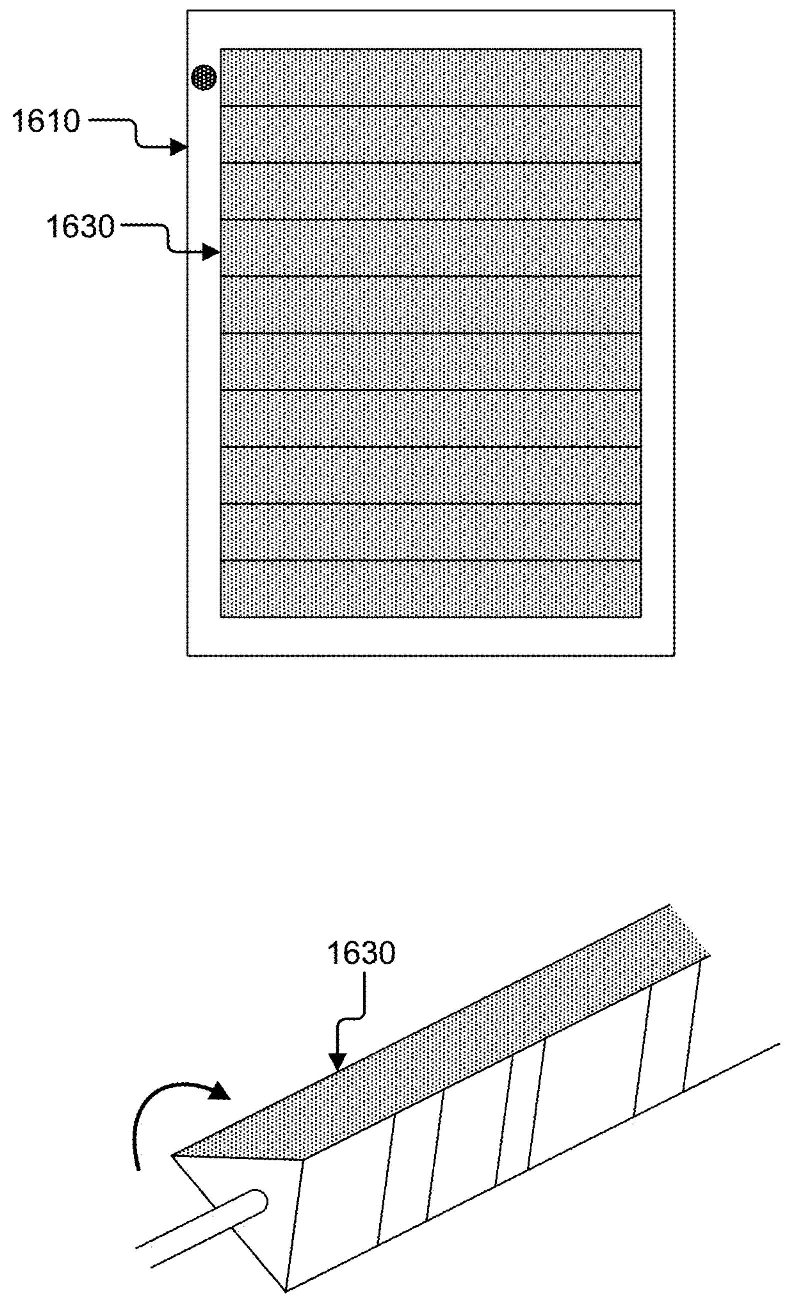
FIG. 16A illustrates an exemplary interchangeable door panel for an interchangeable door system, according to some embodiments of the present disclosure.
Figure 16B:
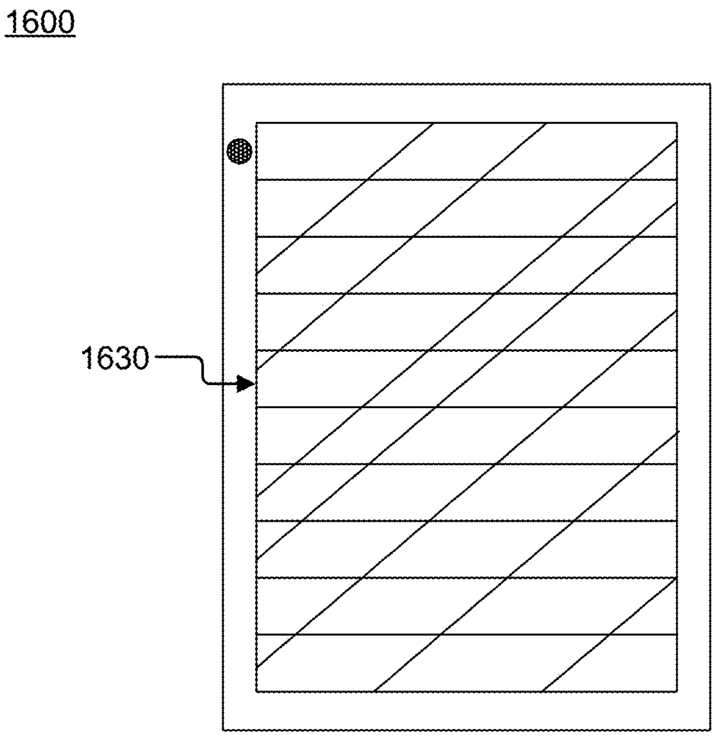
FIG. 16B illustrates an exemplary interchangeable door panel for an interchangeable door system, according to some embodiments of the present disclosure.
Figure 16C:
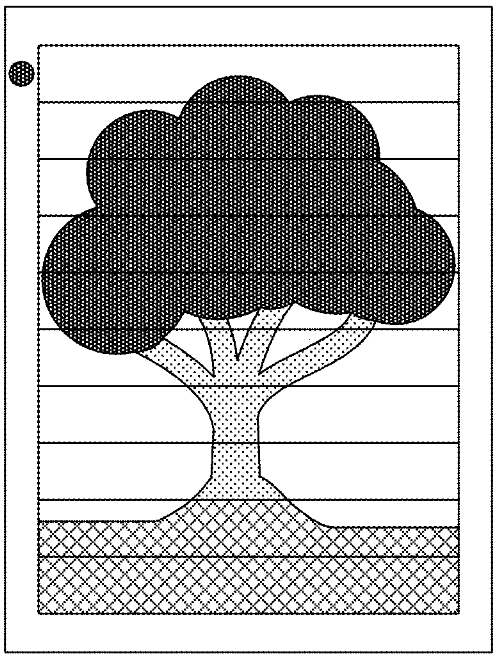
FIG. 16C illustrates an exemplary interchangeable door panel for an interchangeable door system, according to some embodiments of the present disclosure.

Referring now to FIGS. 16A-C, an exemplary interchangeable door panel 1630 for an interchangeable door system 1600, according to some embodiments of the present disclosure, is illustrated. In some embodiments, the interchangeable door system 1600 may comprise at least one door 1610. In some implementations, the interchangeable door system 1600 may comprise a plurality of panels 1630.

In some aspects, each of the panels 1630 may comprise two or more displayable surfaces. In some embodiments, the panels 1630 may be configured to rotate to display one of a plurality of predetermined displayable surfaces. As a non-limiting illustrative example, the panels 1630 may comprise a first displayable surface that is reflective, such that when the first displayable surface is displayed in conjunction with the other panels 1630, a mirror may be formed. On another side of the same panel 1630, a second displayable surface may comprise a portion of an image. When this side is displayed in conjunction with the other panels 1630, the panels 1630 may form an image on the door 1610.

Figure 17A:
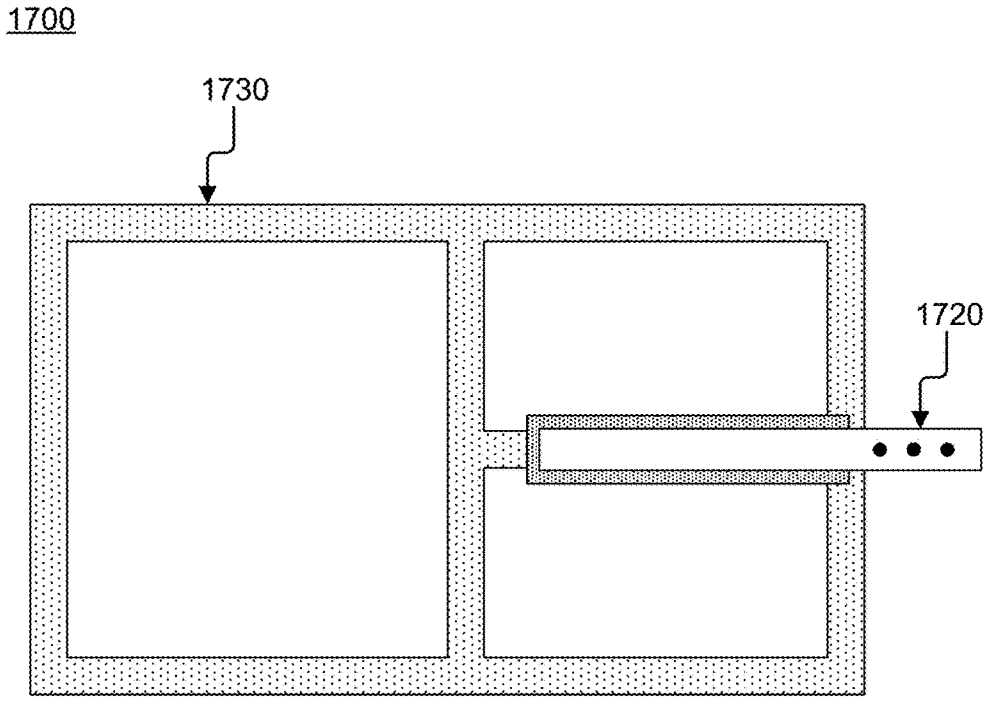
FIG. 17A illustrates an exemplary insertion mechanism for an interchangeable door system, according to some embodiments of the present disclosure.
Figure 17B:
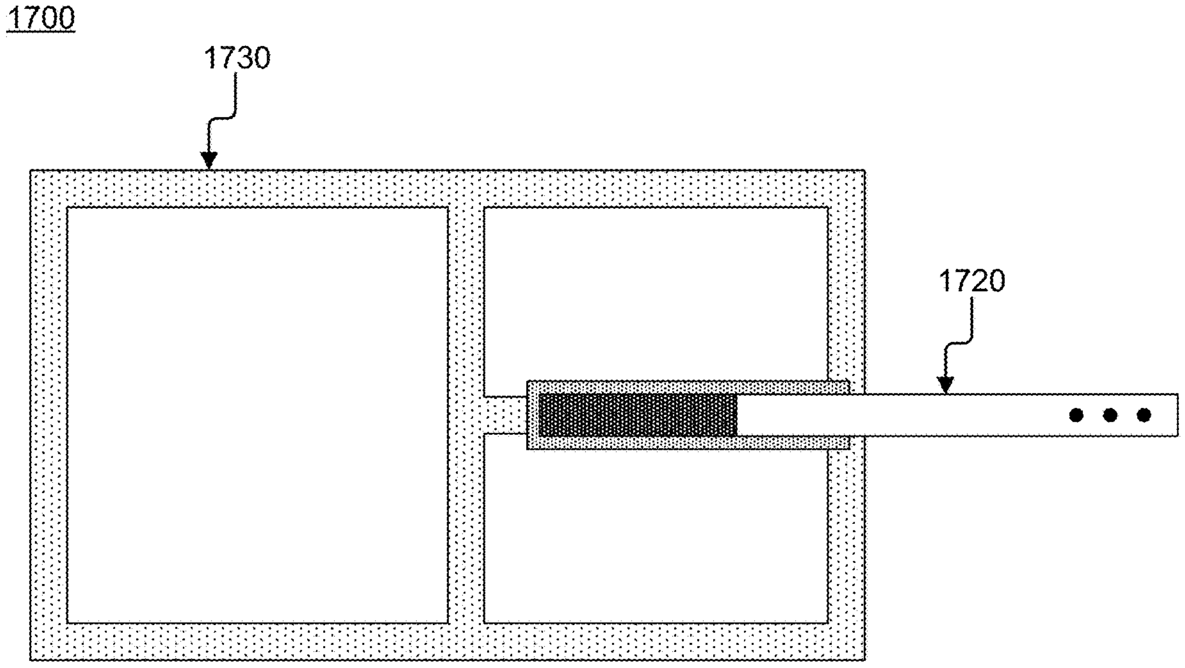
FIG. 17B illustrates an exemplary insertion mechanism for an interchangeable door system, according to some embodiments of the present disclosure.
Figure 18A:
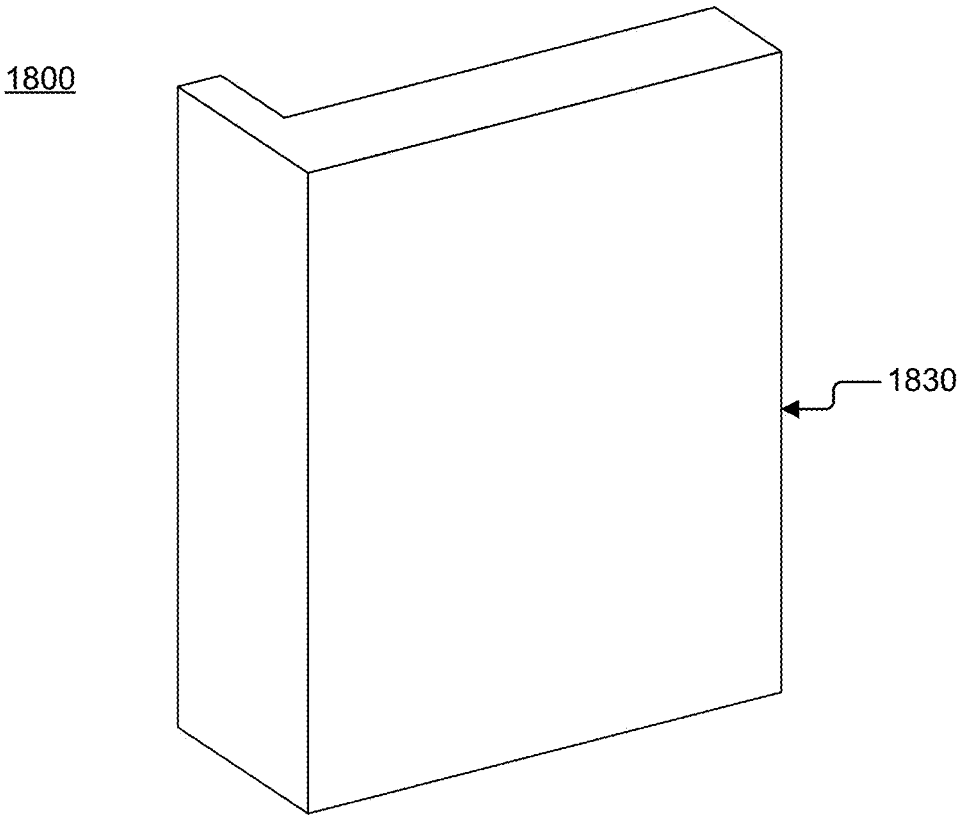
FIG. 18A illustrates an exemplary interchangeable door panel for an interchangeable door system, according to some embodiments of the present disclosure.
Figure 18B:
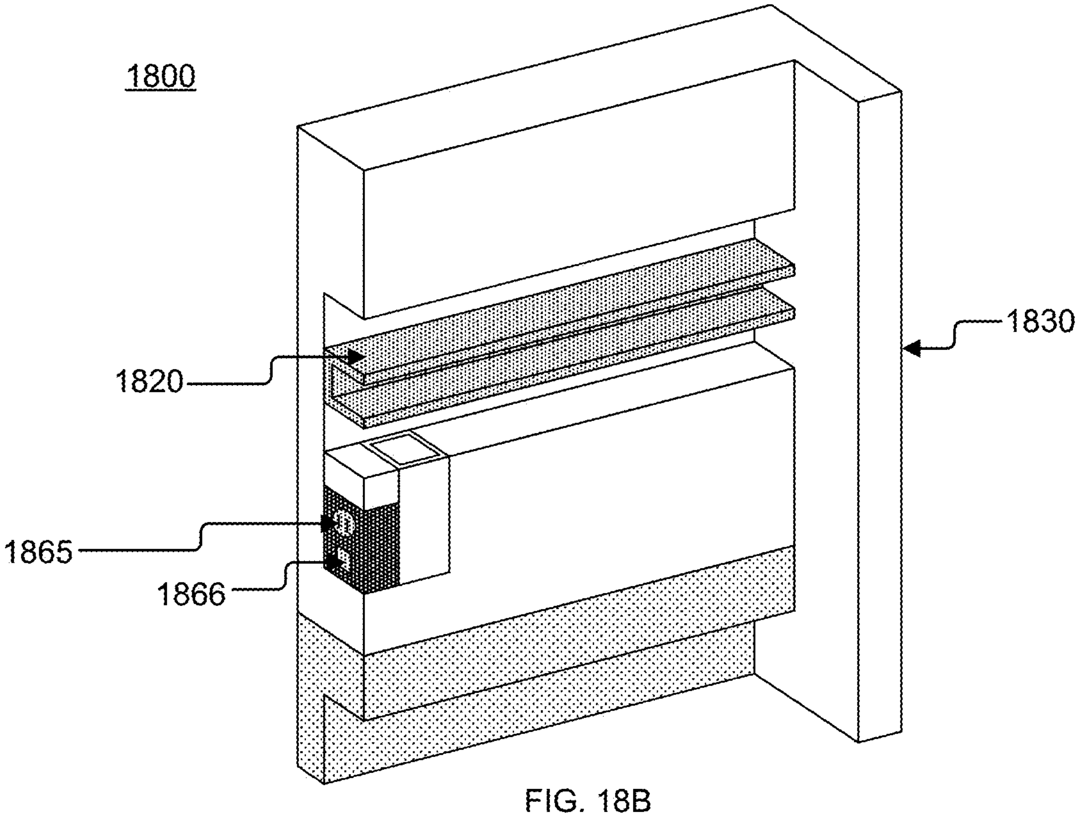
FIG. 18B illustrates an exemplary interchangeable door panel for an interchangeable door system, according to some embodiments of the present disclosure.
Figure 18C:
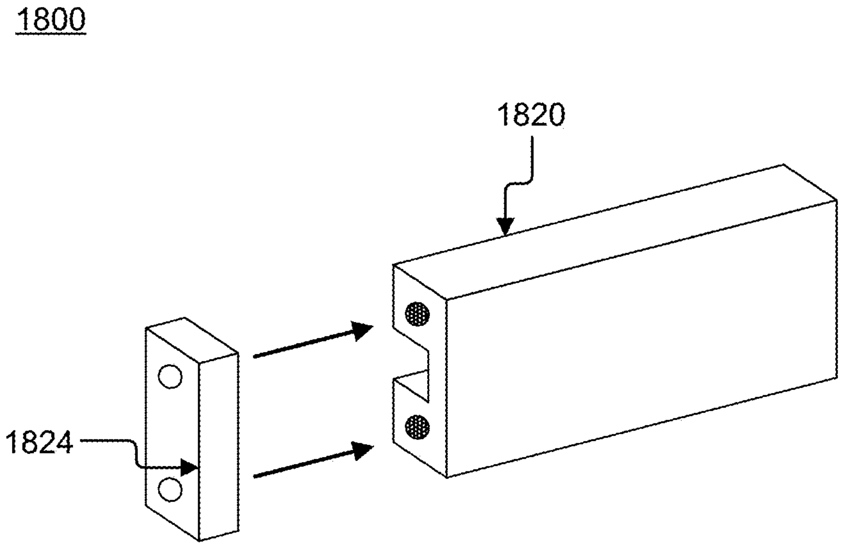
FIG. 18C illustrates an exemplary locking block for an interchangeable door system, according to some embodiments of the present disclosure.
Figure 18D:
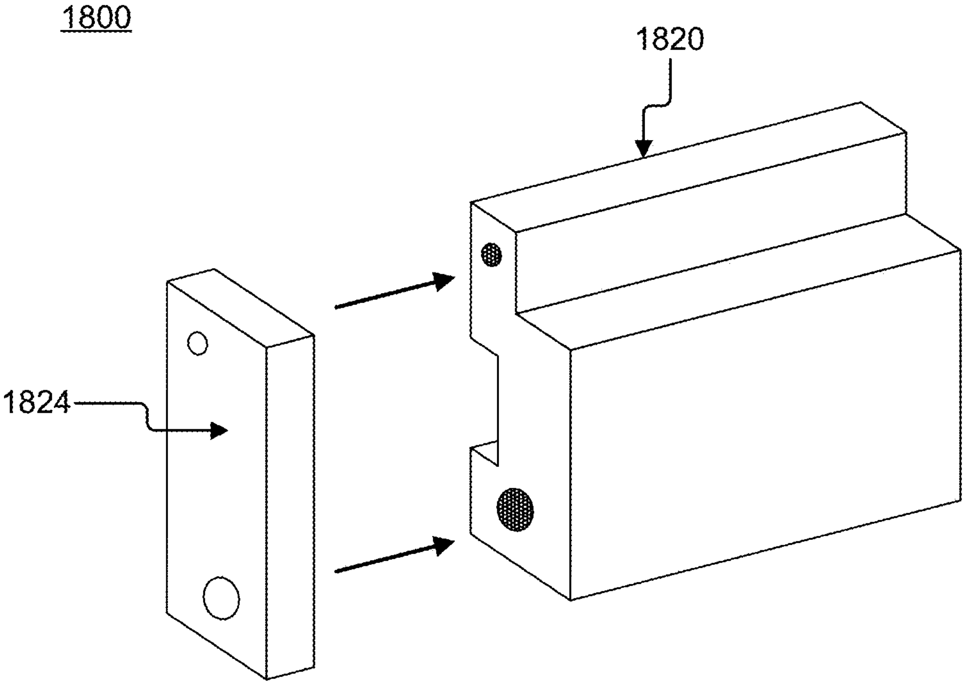
FIG. 18D illustrates an exemplary locking block for an interchangeable door system, according to some embodiments of the present disclosure.

Referring now to FIGS. 17A-B, an exemplary insertion mechanism 1720 for an interchangeable door system 1700, according to some embodiments of the present is disclosure, is illustrated. In some aspects, the interchangeable door system 1700 may comprise at least one interchangeable panel 1730, wherein the panel 1730 may be configured to interface with at least one door via at least one insertion mechanism 1720. In some embodiments, the insertion mechanism 1720 may comprise at least one guide rail and at least one slidable bar, wherein at least a portion of the guide rail may be temporarily or permanently affixed to or integrated with the panel 1730. In some implementations, at least a portion of the slidable bar may be temporarily or permanently affixed to or integrated with the door. In some aspects, the bar may be slidable to achieve linear translational movement within the guide rail such that the bar may be received by the guide rail of panel 1730 when the bar is inserted into and slid within the guide rail. In some non-limiting exemplary embodiments, the slidable bar may be configured to at least temporarily lock in at least one position.

Referring now to FIGS. 18A-D, exemplary interchangeable door panels 1830 and exemplary locking blocks 1824 for an interchangeable door system 1800, according to some embodiments of the present is disclosure, are illustrated. In some aspects, the panel 1830 may comprise an internal frame that comprises at least one insertion mechanism in the form of a guide rail 1820 that may be configured to receive a slidable bar of at least one door. In some implementations, the inner frame of the panel 1830 may comprise at least one conduit 1860, wherein one or more cables, cords, light-emitting diodes ("LEDs"), or similar elements may be configured. In some embodiments, a side surface of the panel 1830 may comprise one or more push-fit style power connectors 1865 and/or data connectors 1866 to facilitate the flow or transmission of data and/or electricity to and/or from panel 1830.

In some implementations, the panel 1830 may comprise a metallic and/wooden frame, such as, for example and not, an aluminum and/or plywood frame. In some embodiments, one or more interior portions of the frame may comprise one or more layers of insulating materials, such as, for example and not limitation, polyvinyl chloride, one or more polycarbonates or thermoplastic polymers, or an amount of aerogel.

In some non-limiting exemplary implementations, the interchangeable door system 1800 may comprise a door frame, wherein one or more portions of the door frame may comprise one or more pivoting or rotating elongated tabs or flaps configured to be altered between a sealed state and an unsealed state, wherein the elongated tabs are configured to achieve the sealed state to form a seal around an outer edge of a door to which the panel 1830 may be attached when the door is closed, while pivoting or rotating to the unsealed state to release the door when a minimum threshold amount of force is applied to the door. In some embodiments, the elongated tabs may be biased towards the sealed state and the unsealed state, such as, for example and not limitation, via one or more compression or extension springs, such that once a minimum threshold amount of force is applied, the tabs transition from one state to the other.

In some aspects, the guide rail 1820 may be configured to interface with a slidable bar or similar element of at least one door. In some implementations, the panel 1830 may comprise at least one locking block 1824, wherein the locking block 1824 may be configured to at least temporarily secure the panel 1830 to the door when one or more protrusions at a distal end of the guide rail 1820 are securely received within one or more slots, recesses, or apertures within the locking block 1824, such as, for example and not limitation, by forming a snap-fit configuration. In some aspects, the locking block 1824 may comprise metal, wood, or plastic, as non-limiting examples.

Figure 19:
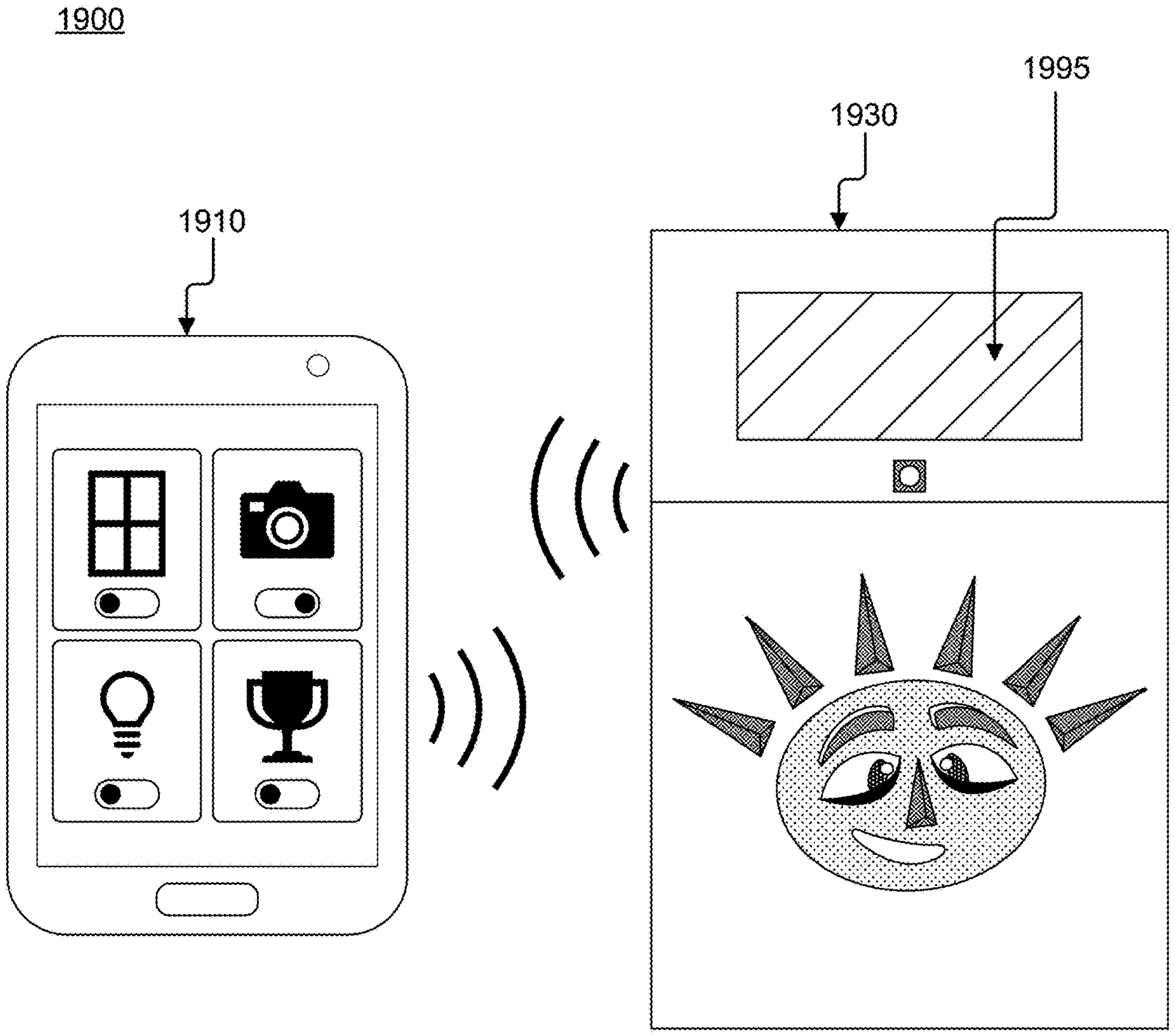
FIG. 19 illustrates an exemplary interchangeable door panel of an interchangeable door system interfacing with a computing device, according to some embodiments of the present disclosure.

Referring now to FIG. 19, an exemplary interchangeable door panel 1930 of an interchangeable door system 1900 interfacing with a computing device 1910, according to some embodiments of the present, is illustrated. In some aspects, the panel 1930 may comprise at least one display mechanism 1995. In some implementations, the display mechanism 1995 may at least partially comprise smart glass. In some embodiments, the display mechanism 1995 may comprise a display screen or monitor, wherein at least a portion of the display screen may comprise a touchscreen interface. By way of example and not limitation, the display mechanism 1995 may be configured to present or display one or more of: a live or recorded feed from one or more cameras configured on an outer surface of the panel 1930; one or more photographs, images, or videos; artwork; a weather forecast; or a calendar or schedule.

In some implementations, the panel 1930 may comprise sufficient hardware, such as at least one controller and at least one transmitting device, to allow the panel 1930 to connect and exchange data with at least one external computing device 1910. In some aspects, the computing device 1910 may comprise a mobile device, such as a mobile phone, smartwatch, or tablet, as non-limiting examples. In some implementations, the computing device 1910 may comprise one or more coded software instructions that, when executed by at least one processor of the computing device 1910, cause the computing device 1910 to generate and display at least one graphical user interface 1900. In some aspects, this may allow a user to remotely control and interact with the various electrical components of the interchangeable door panel 1930, as well as any electronic or computing devices communicatively coupled thereto. As an illustrative example, a user may instruct the display mechanism to display a certain image from the mobile device.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An interchangeable door system, comprising:

at least one door;

at least one interchangeable door panel, wherein the at least one interchangeable door panel is slidably attachable to the at least one door, wherein the at least one interchangeable door panel is configured to be inserted into a plurality of recessed grooves along a face of the at least one door that match the dimensions of extrusions on the at least one interchangeable door panel, wherein the plurality of recessed grooves extend longitudinally across the width of the at least one door; and at least one insertion mechanism comprises the plurality of recessed grooves, wherein the at least one insertion mechanism is configured to slidably attach the at least one interchangeable door panel to the at least one door, wherein the insertion mechanism comprises the plurality of recessed grooves along an exterior of the at least one door.

2. The interchangeable door system of claim 1, further comprising one or more locking pins, wherein the one or more locking pins are configured to removably secure the at least one interchangeable door panel to the at least one door.

3. The interchangeable door system of claim 1, further comprising one or more guide pins, wherein the one or more guide pins are configured to interface with the at least one insertion mechanism to align the at least one interchangeable door panel with the at least one door.

4. The interchangeable door system of claim 1, wherein the at least one interchangeable door panel comprises an internal frame.

5. The interchangeable door system of claim 4, wherein one or more interior portions of the internal frame comprise one or more insulating materials.

6. The interchangeable door system of claim 5, wherein the one or more insulating materials comprise one or more of: polyvinyl chloride, one or more polycarbonates, one or more thermoplastic polymers, or aerogel.

7. The interchangeable door system of claim 1, wherein the at least one interchangeable door panel comprises a plurality of interchangeable door panels.

8. The interchangeable door system of claim 1, wherein the at least one interchangeable door panel comprises at least one electronic device.

9. The interchangeable door system of claim 8, wherein the at least one electronic device comprises at least one display mechanism.

10. The interchangeable door system of claim 9, wherein the at least one display mechanism at least partially comprises smart glass.

11. The interchangeable door system of claim 8, further comprising at least one power source.

12. The interchangeable door system of claim 8, wherein the at least one electronic device comprises at least one of: at least one camera, at least one light emitting device, at least one audio emitting device, or at least one biometric scanner.

13. The interchangeable door system of claim 9 wherein the at least one display mechanism is configured to display at least one image.

14. The interchangeable door system of claim 11, wherein the at least one power source comprises at least one battery.

15. The interchangeable door system of claim 7, wherein each of the plurality of interchangeable door panels comprises a portion of an image to create a larger unitary image.

* * * * *